United States Patent
Sowards et al.

(10) Patent No.: US 12,514,533 B2
(45) Date of Patent: Jan. 6, 2026

(54) ULTRASOUND IMAGING SYSTEM

(71) Applicant: Bard Access Systems, Inc., Salt Lake City, UT (US)

(72) Inventors: Steffan Sowards, Salt Lake City, UT (US); William Robert McLaughlin, Bountiful, UT (US); Anthony K. Misener, Bountiful, UT (US)

(73) Assignee: Bard Access Systems, Inc., Salt Lake City, UT (US)

( * ) Notice: Subject to any disclaimer, the term of this patent is extended or adjusted under 35 U.S.C. 154(b) by 137 days.

(21) Appl. No.: 18/113,003

(22) Filed: Feb. 22, 2023

(65) Prior Publication Data

US 2023/0277154 A1   Sep. 7, 2023

Related U.S. Application Data

(63) Continuation-in-part of application No. 17/684,180, filed on Mar. 1, 2022.

(51) Int. Cl.
*A61B 8/06* (2006.01)
*A61B 8/00* (2006.01)
(Continued)

(52) U.S. Cl.
CPC .............. *A61B 8/06* (2013.01); *A61B 8/0841* (2013.01); *A61B 8/463* (2013.01); *A61B 8/488* (2013.01);
(Continued)

(58) Field of Classification Search
CPC ......... A61B 8/06; A61B 8/0841; A61B 8/463; A61B 8/488; A61B 8/085; A61B 8/5223;
(Continued)

(56) References Cited

U.S. PATENT DOCUMENTS

| | | |
|---|---|---|
| 3,697,917 A | 10/1972 | Orth et al. |
| 5,148,809 A | 9/1992 | Biegeleisen-Knight et al. |

(Continued)

FOREIGN PATENT DOCUMENTS

| | | |
|---|---|---|
| CN | 102871645 A | 1/2013 |
| CN | 105107067 B | 5/2018 |

(Continued)

OTHER PUBLICATIONS

M. Ikhsan, K. K. Tan, AS. Putra, C. F. Kong, et al., "Automatic identification of blood vessel cross-section for central venous catheter placement using a cascading classifier," 39th Annual International Conference of the IEEE Engineering in Medicine and Biology Society (EMBC). pp. 1489-1492 (Year: 2017).

(Continued)

*Primary Examiner* — Kaitlyn E Sebastian
(74) *Attorney, Agent, or Firm* — Rutan & Tucker LLP

(57) ABSTRACT

An ultrasound imaging system configured to assess a blood flow rate through a target vessel. The ultrasound imaging system includes an ultrasound probe having an ultrasound array configured to capture ultrasound image of the target vessel and a doppler array configured to detect the fluid flow through a region of interest of the target vessel. Logic operations of a console of the system and methods include determining a region of interest of the ultrasound image, calculating a percentage of the blood vessel occupied by the vascular access device, utilizing a data training set to predict a blood flow rate after placement of the vascular access device based on a blood flow rate prior to placement of the vascular device, and utilizing a data training set to predict a blood flow rate downstream of the vascular access device based on a blood flow rate upstream of the vascular device.

22 Claims, 7 Drawing Sheets

(51) Int. Cl.
*A61B 8/08* (2006.01)
*G06T 7/11* (2017.01)
*G06T 7/62* (2017.01)
*G06T 11/00* (2006.01)
*G16H 30/20* (2018.01)
*G16H 30/40* (2018.01)

(52) U.S. Cl.
CPC .................. *G06T 7/11* (2017.01); *G06T 7/62* (2017.01); *G06T 11/00* (2013.01); *G16H 30/20* (2018.01); *G16H 30/40* (2018.01); *G06T 2207/20081* (2013.01); *G06T 2207/30104* (2013.01); *G06T 2210/41* (2013.01)

(58) Field of Classification Search
CPC ... G06T 7/11; G06T 7/62; G06T 11/00; G06T 2207/20081; G06T 2207/30104; G06T 2210/41; G16H 30/20; G16H 30/40
See application file for complete search history.

(56) References Cited

U.S. PATENT DOCUMENTS

| | | |
|---|---|---|
| 5,181,513 A | 1/1993 | Touboul et al. |
| 5,325,293 A | 6/1994 | Dorne |
| 5,349,865 A | 9/1994 | Kavli et al. |
| 5,441,052 A | 8/1995 | Miyajima |
| 5,549,554 A | 8/1996 | Miraki |
| 5,573,529 A | 11/1996 | Haak et al. |
| 5,758,650 A | 6/1998 | Miller et al. |
| 5,775,322 A | 7/1998 | Silverstein et al. |
| 5,879,297 A | 3/1999 | Haynor et al. |
| 5,897,503 A | 4/1999 | Lyon et al. |
| 5,908,387 A | 6/1999 | LeFree et al. |
| 5,967,984 A | 10/1999 | Chu et al. |
| 5,970,119 A | 10/1999 | Hofmann |
| 6,004,270 A | 12/1999 | Urbano et al. |
| 6,019,724 A | 2/2000 | Gronningsaeter et al. |
| 6,068,599 A | 5/2000 | Saito et al. |
| 6,074,367 A | 6/2000 | Hubbell |
| 6,129,668 A | 10/2000 | Haynor et al. |
| 6,132,379 A | 10/2000 | Patacsil et al. |
| 6,216,028 B1 | 4/2001 | Jaynor et al. |
| 6,233,476 B1 | 5/2001 | Strommer et al. |
| 6,245,018 B1 | 6/2001 | Lee |
| 6,263,230 B1 | 7/2001 | Haynor et al. |
| 6,375,615 B1 | 4/2002 | Flaherty et al. |
| 6,436,043 B2 | 8/2002 | Bonnefous |
| 6,498,942 B1 | 12/2002 | Esenaliev et al. |
| 6,503,205 B2 | 1/2003 | Manor et al. |
| 6,508,769 B2 | 1/2003 | Bonnefous |
| 6,511,458 B2 | 1/2003 | Milo et al. |
| 6,524,249 B2 | 2/2003 | Moehring et al. |
| 6,543,642 B1 | 4/2003 | Milliorn |
| 6,554,771 B1 | 4/2003 | Buil et al. |
| 6,592,520 B1 | 7/2003 | Peszynski et al. |
| 6,592,565 B2 | 7/2003 | Twardowski |
| 6,601,705 B2 | 8/2003 | Molina et al. |
| 6,612,992 B1 | 9/2003 | Hossack et al. |
| 6,613,002 B1 | 9/2003 | Clark et al. |
| 6,623,431 B1 | 9/2003 | Sakuma et al. |
| 6,641,538 B2 | 11/2003 | Nakaya et al. |
| 6,647,135 B2 | 11/2003 | Bonnefous |
| 6,687,386 B1 | 2/2004 | Ito et al. |
| 6,733,458 B1 | 5/2004 | Steins et al. |
| 6,749,569 B1 | 6/2004 | Pellegretti |
| 6,754,608 B2 | 6/2004 | Svanerudh et al. |
| 6,755,789 B2 | 6/2004 | Stringer et al. |
| 6,840,379 B2 | 1/2005 | Franks-Farah et al. |
| 6,857,196 B2 | 2/2005 | Dalrymple |
| 6,979,294 B1 | 12/2005 | Selzer et al. |
| 7,074,187 B2 | 7/2006 | Selzer et al. |
| 7,244,234 B2 | 7/2007 | Ridley et al. |
| 7,359,554 B2 | 4/2008 | Klingensmith et al. |
| 7,534,209 B2 | 5/2009 | Abend et al. |
| 7,599,730 B2 | 10/2009 | Hunter et al. |
| 7,637,870 B2 | 12/2009 | Flaherty et al. |
| 7,681,579 B2 | 3/2010 | Schwartz |
| 7,691,061 B2 | 4/2010 | Hirota |
| 7,699,779 B2 | 4/2010 | Sasaki et al. |
| 7,720,520 B2 | 5/2010 | Willis |
| 7,727,153 B2 | 6/2010 | Fritz et al. |
| 7,734,326 B2 | 6/2010 | Pedain et al. |
| 7,831,449 B2 | 11/2010 | Ying et al. |
| 7,905,837 B2 | 3/2011 | Suzuki |
| 7,925,327 B2 | 4/2011 | Weese |
| 7,927,278 B2 | 4/2011 | Selzer et al. |
| 8,014,848 B2 | 9/2011 | Birkenbach et al. |
| 8,038,619 B2 | 10/2011 | Steinbacher |
| 8,060,181 B2 | 11/2011 | Rodriguez Ponce et al. |
| 8,075,488 B2 | 12/2011 | Burton |
| 8,090,427 B2 | 1/2012 | Eck et al. |
| 8,105,239 B2 | 1/2012 | Specht |
| 8,172,754 B2 | 5/2012 | Watanabe et al. |
| 8,175,368 B2 | 5/2012 | Sathyanarayana |
| 8,200,313 B1 | 6/2012 | Rambod et al. |
| 8,211,023 B2 | 7/2012 | Swan et al. |
| 8,228,347 B2 | 7/2012 | Beasley et al. |
| 8,298,147 B2 | 10/2012 | Huennekens et al. |
| 8,303,505 B2 | 11/2012 | Webler et al. |
| 8,323,202 B2 | 12/2012 | Roschak et al. |
| 8,328,727 B2 | 12/2012 | Miele et al. |
| 8,336,536 B1 | 12/2012 | Wood-Putnam et al. |
| 8,388,541 B2 | 3/2013 | Messerly et al. |
| 8,409,103 B2 | 4/2013 | Grunwald et al. |
| 8,449,465 B2 | 5/2013 | Nair et al. |
| 8,553,954 B2 | 10/2013 | Saikia |
| 8,556,815 B2 | 10/2013 | Pelissier et al. |
| 8,585,600 B2 | 11/2013 | Liu et al. |
| 8,622,913 B2 | 1/2014 | Dentinger et al. |
| 8,706,457 B2 | 4/2014 | Hart et al. |
| 8,727,988 B2 | 5/2014 | Flaherty et al. |
| 8,734,357 B2 | 5/2014 | Taylor |
| 8,744,211 B2 | 6/2014 | Owen |
| 8,754,865 B2 | 6/2014 | Merritt et al. |
| 8,764,663 B2 | 7/2014 | Smok et al. |
| 8,781,194 B2 | 7/2014 | Malek et al. |
| 8,781,555 B2 | 7/2014 | Burnside et al. |
| 8,790,263 B2 | 7/2014 | Randall et al. |
| 8,849,382 B2 | 9/2014 | Cox et al. |
| 8,939,908 B2 | 1/2015 | Suzuki et al. |
| 8,961,420 B2 | 2/2015 | Zhang |
| 9,022,940 B2 | 5/2015 | Meier |
| 9,087,147 B1 | 7/2015 | Fonte |
| 9,138,290 B2 | 9/2015 | Hadjicostis |
| 9,199,082 B1 | 12/2015 | Yared et al. |
| 9,204,858 B2 | 12/2015 | Pelissier et al. |
| 9,220,477 B2 | 12/2015 | Urabe et al. |
| 9,295,447 B2 | 3/2016 | Shah |
| 9,320,493 B2 | 4/2016 | Visveshwara |
| 9,357,980 B2 | 6/2016 | Toji et al. |
| 9,364,171 B2 | 6/2016 | Harris et al. |
| 9,427,207 B2 | 8/2016 | Sheldon et al. |
| 9,445,780 B2 | 9/2016 | Hossack et al. |
| 9,456,766 B2 | 10/2016 | Cox et al. |
| 9,456,804 B2 | 10/2016 | Tamada |
| 9,468,413 B2 | 10/2016 | Hall et al. |
| 9,492,097 B2 | 11/2016 | Wilkes et al. |
| 9,521,961 B2 | 12/2016 | Silverstein et al. |
| 9,554,716 B2 | 1/2017 | Burnside et al. |
| 9,582,876 B2 | 2/2017 | Specht |
| 9,610,061 B2 | 4/2017 | Ebbini et al. |
| 9,636,031 B2 | 5/2017 | Cox |
| 9,649,037 B2 | 5/2017 | Lowe et al. |
| 9,649,048 B2 | 5/2017 | Cox et al. |
| 9,702,969 B2 | 7/2017 | Hope Simpson et al. |
| 9,715,757 B2 | 7/2017 | Ng et al. |
| 9,717,415 B2 | 8/2017 | Cohen et al. |
| 9,731,066 B2 | 8/2017 | Liu et al. |
| 9,814,433 B2 | 11/2017 | Benishti et al. |
| 9,814,531 B2 | 11/2017 | Yagi et al. |
| 9,861,337 B2 | 1/2018 | Patwardhan et al. |
| 9,895,138 B2 | 2/2018 | Sasaki |

(56) References Cited

U.S. PATENT DOCUMENTS

| | | |
|---|---|---|
| 9,913,605 B2 | 3/2018 | Harris et al. |
| 9,949,720 B2 | 4/2018 | Southard et al. |
| 10,043,272 B2 | 8/2018 | Forzoni et al. |
| 10,449,330 B2 | 10/2019 | Newman et al. |
| 10,524,691 B2 | 1/2020 | Newman et al. |
| 10,751,509 B2 | 8/2020 | Misener |
| 11,564,861 B1 | 1/2023 | Gaines |
| 11,900,593 B2 | 2/2024 | Dhatt et al. |
| 2002/0038088 A1 | 3/2002 | Imran et al. |
| 2003/0047126 A1 | 3/2003 | Tomaschko |
| 2003/0106825 A1 | 6/2003 | Molina et al. |
| 2003/0109910 A1 | 6/2003 | Lachenbruch et al. |
| 2003/0120154 A1 | 6/2003 | Sauer et al. |
| 2003/0125629 A1 | 7/2003 | Ustuner |
| 2003/0135115 A1 | 7/2003 | Burdette et al. |
| 2003/0149366 A1 | 8/2003 | Stringer et al. |
| 2003/0167030 A1* | 9/2003 | Weitzel ............... A61M 1/3663 604/8 |
| 2003/0216648 A1 | 11/2003 | Lizzi et al. |
| 2004/0015080 A1 | 1/2004 | Kelly et al. |
| 2004/0055925 A1 | 3/2004 | Franks-Farah et al. |
| 2004/0197267 A1 | 10/2004 | Black et al. |
| 2005/0000975 A1 | 1/2005 | Carco et al. |
| 2005/0049504 A1 | 3/2005 | Lo et al. |
| 2005/0075597 A1* | 4/2005 | Vournakis ............... A61P 31/14 514/807 |
| 2005/0165299 A1 | 7/2005 | Kressy et al. |
| 2005/0251030 A1 | 11/2005 | Azar et al. |
| 2005/0267365 A1 | 12/2005 | Sokulin et al. |
| 2006/0004290 A1 | 1/2006 | Smith et al. |
| 2006/0013523 A1 | 1/2006 | Childers et al. |
| 2006/0015039 A1 | 1/2006 | Cassidy et al. |
| 2006/0020204 A1 | 1/2006 | Serra et al. |
| 2006/0047617 A1 | 3/2006 | Bacioiu et al. |
| 2006/0079781 A1 | 4/2006 | Germond-Rouet et al. |
| 2006/0184029 A1 | 8/2006 | Haim et al. |
| 2006/0210130 A1 | 9/2006 | Germond-Rouet et al. |
| 2006/0241463 A1 | 10/2006 | Shau et al. |
| 2007/0043341 A1 | 2/2007 | Anderson et al. |
| 2007/0049822 A1 | 3/2007 | Bunce et al. |
| 2007/0073155 A1 | 3/2007 | Park et al. |
| 2007/0167738 A1 | 7/2007 | Timinger et al. |
| 2007/0199848 A1 | 8/2007 | Ellswood et al. |
| 2007/0239005 A1 | 10/2007 | Ogasawara |
| 2007/0239120 A1 | 10/2007 | Brock et al. |
| 2007/0249911 A1 | 10/2007 | Simon |
| 2007/0287886 A1 | 12/2007 | Saadat |
| 2008/0021322 A1 | 1/2008 | Stone et al. |
| 2008/0033293 A1 | 2/2008 | Beasley et al. |
| 2008/0033759 A1 | 2/2008 | Finlay |
| 2008/0051657 A1 | 2/2008 | Rold |
| 2008/0108930 A1* | 5/2008 | Weitzel ............... A61M 1/3656 210/741 |
| 2008/0125651 A1 | 5/2008 | Watanabe et al. |
| 2008/0146915 A1 | 6/2008 | McMorrow |
| 2008/0177186 A1 | 7/2008 | Slater et al. |
| 2008/0221425 A1 | 9/2008 | Olson et al. |
| 2008/0269605 A1 | 10/2008 | Nakaya |
| 2008/0294037 A1 | 11/2008 | Richter |
| 2008/0300491 A1 | 12/2008 | Bonde et al. |
| 2009/0012399 A1 | 1/2009 | Sunagawa et al. |
| 2009/0012401 A1 | 1/2009 | Steinbacher |
| 2009/0074280 A1 | 3/2009 | Lu et al. |
| 2009/0105594 A1 | 4/2009 | Reynolds et al. |
| 2009/0118612 A1 | 5/2009 | Grunwald et al. |
| 2009/0124903 A1 | 5/2009 | Osaka |
| 2009/0137887 A1 | 5/2009 | Shariati et al. |
| 2009/0137907 A1 | 5/2009 | Takimoto et al. |
| 2009/0143672 A1 | 6/2009 | Harms et al. |
| 2009/0143684 A1 | 6/2009 | Cermak et al. |
| 2009/0156926 A1 | 6/2009 | Messerly et al. |
| 2009/0281413 A1 | 11/2009 | Boyden et al. |
| 2009/0306509 A1 | 12/2009 | Pedersen et al. |
| 2010/0010348 A1 | 1/2010 | Halmann |
| 2010/0168576 A1 | 7/2010 | Poland et al. |
| 2010/0211026 A2 | 8/2010 | Sheetz et al. |
| 2010/0249598 A1 | 9/2010 | Smith et al. |
| 2010/0286515 A1 | 11/2010 | Gravenstein et al. |
| 2010/0312121 A1 | 12/2010 | Guan |
| 2010/0324423 A1 | 12/2010 | El-Aklouk et al. |
| 2011/0002518 A1 | 1/2011 | Ziv-Ari et al. |
| 2011/0026796 A1 | 2/2011 | Hyun et al. |
| 2011/0071404 A1 | 3/2011 | Schmitt et al. |
| 2011/0074244 A1 | 3/2011 | Osawa |
| 2011/0087107 A1 | 4/2011 | Lindekugel et al. |
| 2011/0166451 A1 | 7/2011 | Blaivas et al. |
| 2011/0282188 A1 | 11/2011 | Burnside et al. |
| 2011/0295108 A1 | 12/2011 | Cox et al. |
| 2011/0313293 A1 | 12/2011 | Lindekugel et al. |
| 2012/0136242 A1 | 5/2012 | Qi et al. |
| 2012/0136256 A1 | 5/2012 | Nozaki et al. |
| 2012/0143029 A1 | 6/2012 | Silverstein et al. |
| 2012/0165679 A1 | 6/2012 | Orome et al. |
| 2012/0179038 A1 | 7/2012 | Meurer et al. |
| 2012/0179042 A1 | 7/2012 | Fukumoto et al. |
| 2012/0179044 A1 | 7/2012 | Chiang et al. |
| 2012/0197132 A1 | 8/2012 | O'Connor |
| 2012/0220865 A1 | 8/2012 | Brown et al. |
| 2012/0277576 A1 | 11/2012 | Lui |
| 2013/0041250 A1 | 2/2013 | Pelissier et al. |
| 2013/0102889 A1 | 4/2013 | Southard et al. |
| 2013/0131499 A1 | 5/2013 | Chan et al. |
| 2013/0131502 A1 | 5/2013 | Blaivas et al. |
| 2013/0144166 A1* | 6/2013 | Specht ............... A61B 8/4488 600/441 |
| 2013/0150724 A1 | 6/2013 | Blaivas et al. |
| 2013/0188832 A1 | 7/2013 | Ma et al. |
| 2013/0197367 A1 | 8/2013 | Smok et al. |
| 2013/0218024 A1 | 8/2013 | Boctor et al. |
| 2013/0323700 A1 | 12/2013 | Samosky et al. |
| 2013/0338503 A1 | 12/2013 | Cohen et al. |
| 2013/0338508 A1 | 12/2013 | Nakamura et al. |
| 2013/0345566 A1 | 12/2013 | Weitzel et al. |
| 2014/0005530 A1 | 1/2014 | Liu et al. |
| 2014/0031694 A1 | 1/2014 | Solek |
| 2014/0066779 A1 | 3/2014 | Nakanishi |
| 2014/0073976 A1 | 3/2014 | Fonte et al. |
| 2014/0100440 A1 | 4/2014 | Cheline et al. |
| 2014/0114194 A1 | 4/2014 | Kanayama et al. |
| 2014/0170620 A1 | 6/2014 | Savitsky et al. |
| 2014/0180098 A1 | 6/2014 | Flaherty et al. |
| 2014/0180116 A1 | 6/2014 | Lindekugel et al. |
| 2014/0188133 A1 | 7/2014 | Misener |
| 2014/0188440 A1 | 7/2014 | Donhowe et al. |
| 2014/0276048 A1 | 9/2014 | Kiley et al. |
| 2014/0276059 A1 | 9/2014 | Sheehan |
| 2014/0276069 A1 | 9/2014 | Amble et al. |
| 2014/0276081 A1 | 9/2014 | Tegels |
| 2014/0276085 A1 | 9/2014 | Miller |
| 2014/0276690 A1 | 9/2014 | Grace |
| 2014/0296694 A1 | 10/2014 | Jaworski |
| 2014/0343431 A1 | 11/2014 | Vajinepalli et al. |
| 2014/0357994 A1 | 12/2014 | Jin et al. |
| 2015/0005738 A1 | 1/2015 | Blacker |
| 2015/0011887 A1 | 1/2015 | Ahn et al. |
| 2015/0065916 A1 | 3/2015 | Maguire et al. |
| 2015/0073279 A1 | 3/2015 | Cai et al. |
| 2015/0112200 A1 | 4/2015 | Oberg et al. |
| 2015/0141821 A1 | 5/2015 | Yoshikawa et al. |
| 2015/0190111 A1 | 7/2015 | Fry |
| 2015/0209003 A1 | 7/2015 | Halmann et al. |
| 2015/0209113 A1 | 7/2015 | Burkholz et al. |
| 2015/0209510 A1* | 7/2015 | Burkholz ............... G06F 3/011 604/93.01 |
| 2015/0209526 A1 | 7/2015 | Matsubara et al. |
| 2015/0245820 A1 | 9/2015 | Tamada |
| 2015/0257735 A1 | 9/2015 | Ball et al. |
| 2015/0272448 A1* | 10/2015 | Fonte ............... A61B 5/0263 600/504 |
| 2015/0282890 A1 | 10/2015 | Cohen et al. |
| 2015/0294497 A1 | 10/2015 | Ng et al. |
| 2015/0297097 A1 | 10/2015 | Matsubara et al. |
| 2015/0342572 A1 | 12/2015 | Tahmasebi Maraghoosh et al. |
| 2015/0359520 A1 | 12/2015 | Shan et al. |

(56) References Cited

U.S. PATENT DOCUMENTS

| | | |
|---|---|---|
| 2015/0359991 A1 | 12/2015 | Dunbar et al. |
| 2016/0000367 A1 | 1/2016 | Lyon |
| 2016/0000399 A1 | 1/2016 | Halmann et al. |
| 2016/0026894 A1 | 1/2016 | Nagase |
| 2016/0029995 A1 | 2/2016 | Navratil et al. |
| 2016/0038119 A1 | 2/2016 | Desjardins |
| 2016/0081674 A1 | 3/2016 | Bagwan et al. |
| 2016/0113517 A1 | 4/2016 | Lee et al. |
| 2016/0113699 A1 | 4/2016 | Sverdlik et al. |
| 2016/0120607 A1 | 5/2016 | Sorotzkin et al. |
| 2016/0125639 A1 | 5/2016 | Park et al. |
| 2016/0157831 A1 | 6/2016 | Kang et al. |
| 2016/0166232 A1 | 6/2016 | Merritt |
| 2016/0202053 A1 | 7/2016 | Walker et al. |
| 2016/0211045 A1 | 7/2016 | Jeon et al. |
| 2016/0213398 A1 | 7/2016 | Liu |
| 2016/0220124 A1 | 8/2016 | Grady et al. |
| 2016/0259992 A1 | 9/2016 | Knodt et al. |
| 2016/0278869 A1 | 9/2016 | Grunwald |
| 2016/0287214 A1 | 10/2016 | Ralovich et al. |
| 2016/0296208 A1 | 10/2016 | Sethuraman et al. |
| 2016/0374644 A1 | 12/2016 | Mauldin, Jr. et al. |
| 2017/0014105 A1 | 1/2017 | Chono |
| 2017/0020561 A1 | 1/2017 | Cox et al. |
| 2017/0079548 A1 | 3/2017 | Silverstein et al. |
| 2017/0086785 A1 | 3/2017 | Bjaerum |
| 2017/0090571 A1 | 3/2017 | Bjaerum et al. |
| 2017/0103534 A1 | 4/2017 | Park et al. |
| 2017/0143312 A1 | 5/2017 | Hedlund et al. |
| 2017/0164923 A1 | 6/2017 | Matsumoto |
| 2017/0172666 A1 | 6/2017 | Govari et al. |
| 2017/0215842 A1 | 8/2017 | Ryu et al. |
| 2017/0231553 A1 | 8/2017 | Igarashi et al. |
| 2017/0252004 A1 | 9/2017 | Broad et al. |
| 2017/0258522 A1 | 9/2017 | Goshgarian et al. |
| 2017/0259013 A1 | 9/2017 | Boyden et al. |
| 2017/0328751 A1 | 11/2017 | Lemke |
| 2017/0367678 A1 | 12/2017 | Sirtori et al. |
| 2018/0015256 A1* | 1/2018 | Southard ............ A61B 8/0841 |
| 2018/0116723 A1 | 5/2018 | Hettrick et al. |
| 2018/0125450 A1 | 5/2018 | Blackbourne et al. |
| 2018/0161502 A1 | 6/2018 | Nanan et al. |
| 2018/0199914 A1 | 7/2018 | Ramachandran et al. |
| 2018/0214119 A1 | 8/2018 | Mehrmohammadi et al. |
| 2018/0228465 A1 | 8/2018 | Southard et al. |
| 2018/0235649 A1 | 8/2018 | Elkadi |
| 2018/0235709 A1 | 8/2018 | Donhowe et al. |
| 2018/0289927 A1 | 10/2018 | Messerly |
| 2018/0296185 A1 | 10/2018 | Cox et al. |
| 2018/0310955 A1 | 11/2018 | Lindekugel et al. |
| 2018/0333135 A1 | 11/2018 | Kim et al. |
| 2018/0344293 A1 | 12/2018 | Raju et al. |
| 2019/0029636 A1 | 1/2019 | Lee et al. |
| 2019/0060001 A1 | 2/2019 | Kohli et al. |
| 2019/0060014 A1 | 2/2019 | Hazelton et al. |
| 2019/0090855 A1 | 3/2019 | Kobayashi et al. |
| 2019/0125210 A1 | 5/2019 | Govari et al. |
| 2019/0200951 A1 | 7/2019 | Meier |
| 2019/0239848 A1 | 8/2019 | Bedi et al. |
| 2019/0239850 A1 | 8/2019 | Dalvin et al. |
| 2019/0307419 A1 | 10/2019 | Durfee |
| 2019/0307515 A1 | 10/2019 | Naito et al. |
| 2019/0307516 A1 | 10/2019 | Schotzko et al. |
| 2019/0365347 A1 | 12/2019 | Abe |
| 2019/0365348 A1 | 12/2019 | Toume et al. |
| 2019/0365354 A1 | 12/2019 | Du |
| 2020/0027210 A1 | 1/2020 | Haemel et al. |
| 2020/0069929 A1* | 3/2020 | Mason ............... A61M 1/3656 |
| 2020/0107596 A1 | 4/2020 | Caruso et al. |
| 2020/0113540 A1 | 4/2020 | Gijsbers et al. |
| 2020/0163654 A1 | 5/2020 | Satir et al. |
| 2020/0200900 A1 | 6/2020 | Asami et al. |
| 2020/0229795 A1 | 7/2020 | Tadross et al. |
| 2020/0230391 A1 | 7/2020 | Burkholz et al. |
| 2020/0237403 A1 | 7/2020 | Southard et al. |
| 2020/0281563 A1 | 9/2020 | Muller et al. |
| 2020/0359990 A1 | 11/2020 | Poland et al. |
| 2020/0390416 A1 | 12/2020 | Swan et al. |
| 2021/0045716 A1 | 2/2021 | Shiran et al. |
| 2021/0059639 A1 | 3/2021 | Howell |
| 2021/0077058 A1 | 3/2021 | Mashood et al. |
| 2021/0093383 A1 | 4/2021 | Wang et al. |
| 2021/0137492 A1 | 5/2021 | Imai |
| 2021/0146167 A1 | 5/2021 | Barthe et al. |
| 2021/0161510 A1 | 6/2021 | Sasaki et al. |
| 2021/0186467 A1 | 6/2021 | Urabe et al. |
| 2021/0212658 A1 | 7/2021 | McGrath et al. |
| 2021/0212668 A1 | 7/2021 | Li et al. |
| 2021/0267569 A1* | 9/2021 | Yamamoto ............ A61B 8/5246 |
| 2021/0267570 A1 | 9/2021 | Ulman et al. |
| 2021/0295048 A1 | 9/2021 | Buras et al. |
| 2021/0315538 A1 | 10/2021 | Brandl et al. |
| 2021/0373602 A1 | 12/2021 | Min |
| 2021/0378627 A1 | 12/2021 | Yarmush et al. |
| 2022/0019313 A1 | 1/2022 | He et al. |
| 2022/0022969 A1 | 1/2022 | Misener |
| 2022/0039777 A1 | 2/2022 | Durfee |
| 2022/0039829 A1 | 2/2022 | Zijlstra et al. |
| 2022/0071593 A1 | 3/2022 | Tran |
| 2022/0096053 A1 | 3/2022 | Sethuraman et al. |
| 2022/0096797 A1 | 3/2022 | Prince |
| 2022/0104791 A1 | 4/2022 | Matsumoto |
| 2022/0104886 A1 | 4/2022 | Blanchard et al. |
| 2022/0117582 A1 | 4/2022 | McLaughlin et al. |
| 2022/0160434 A1 | 5/2022 | Messerly et al. |
| 2022/0168050 A1 | 6/2022 | Sowards et al. |
| 2022/0172354 A1 | 6/2022 | Misener et al. |
| 2022/0225963 A1 | 7/2022 | Sutton et al. |
| 2022/0233346 A1 | 7/2022 | McElya |
| 2022/0296303 A1 | 9/2022 | McLeod et al. |
| 2022/0304652 A1 | 9/2022 | Peterson et al. |
| 2022/0330922 A1 | 10/2022 | Sowards et al. |
| 2022/0334251 A1 | 10/2022 | Sowards et al. |
| 2022/0361840 A1 | 11/2022 | Matsumoto et al. |
| 2023/0048327 A1 | 2/2023 | Lampe et al. |
| 2023/0107629 A1 | 4/2023 | Sowards et al. |
| 2023/0113291 A1 | 4/2023 | de Wild et al. |
| 2023/0132148 A1 | 4/2023 | Sowards et al. |
| 2023/0135562 A1 | 5/2023 | Misener et al. |
| 2023/0135757 A1 | 5/2023 | Bauer et al. |
| 2023/0138970 A1 | 5/2023 | Sowards et al. |
| 2023/0148872 A1 | 5/2023 | Sowards et al. |
| 2023/0201539 A1 | 6/2023 | Howell |
| 2023/0277153 A1 | 9/2023 | Sowards et al. |
| 2023/0293143 A1 | 9/2023 | Sowards et al. |
| 2023/0298757 A1 | 9/2023 | Golan et al. |
| 2023/0338010 A1 | 10/2023 | Sturm |
| 2023/0371928 A1 | 11/2023 | Rajguru et al. |
| 2023/0397900 A1 | 12/2023 | Prince |
| 2024/0065673 A1 | 2/2024 | Sowards et al. |
| 2024/0307024 A1 | 9/2024 | Sowards et al. |
| 2025/0017559 A1 | 1/2025 | Denny et al. |
| 2025/0057501 A1 | 2/2025 | Prince |
| 2025/0104238 A1 | 3/2025 | Misener et al. |
| 2025/0177060 A1 | 6/2025 | Messerly et al. |
| 2025/0186026 A1 | 6/2025 | Tran |

FOREIGN PATENT DOCUMENTS

| | | |
|---|---|---|
| EP | 0933063 A1 | 8/1999 |
| EP | 1504713 A1 | 2/2005 |
| EP | 1591074 B1 | 5/2008 |
| EP | 2823766 A1 | 1/2015 |
| EP | 3181083 A1 | 6/2017 |
| EP | 3870059 | 9/2021 |
| JP | 2000271136 A | 10/2000 |
| JP | 2007222291 A | 9/2007 |
| JP | 2014150928 A | 8/2014 |
| JP | 2018175547 A | 11/2018 |
| KR | 20180070878 A | 6/2018 |
| KR | 102176196 B1 | 11/2020 |
| WO | 2004082749 A2 | 9/2004 |
| WO | 2007115174 A2 | 10/2007 |
| WO | 2010029521 A2 | 3/2010 |

(56) References Cited

FOREIGN PATENT DOCUMENTS

| | | |
|---|---|---|
| WO | 2010076808 A1 | 7/2010 |
| WO | 2013059714 A1 | 4/2013 |
| WO | 2014/115150 A1 | 7/2014 |
| WO | 2015/017270 A1 | 2/2015 |
| WO | 2016/081023 A1 | 5/2016 |
| WO | 2017096487 A1 | 6/2017 |
| WO | 2017214428 A1 | 12/2017 |
| WO | 2018/026878 A1 | 2/2018 |
| WO | 2018134726 A1 | 7/2018 |
| WO | 2018138343 A1 | 8/2018 |
| WO | 2019/232451 A1 | 12/2019 |
| WO | 2020/002620 A1 | 1/2020 |
| WO | 2020/016018 A1 | 1/2020 |
| WO | 2019/232454 A9 | 2/2020 |
| WO | 2020/044769 A1 | 3/2020 |
| WO | 2020067897 A1 | 4/2020 |
| WO | 2020083660 A1 | 4/2020 |
| WO | 2020/186198 A1 | 9/2020 |
| WO | 2021123905 A2 | 6/2021 |
| WO | 2021198226 A1 | 10/2021 |
| WO | 2022/072727 A2 | 4/2022 |
| WO | 2022/081904 A1 | 4/2022 |
| WO | WO-2022069208 A1 * | 4/2022 |
| WO | 2022/119853 A1 | 6/2022 |
| WO | 2022115479 A1 | 6/2022 |
| WO | 2022119856 A1 | 6/2022 |
| WO | 2022/221703 A1 | 10/2022 |
| WO | 2022/221714 A1 | 10/2022 |
| WO | 2023059512 A1 | 4/2023 |
| WO | 2023076268 A1 | 5/2023 |
| WO | 2023081220 A1 | 5/2023 |
| WO | 2023081223 A1 | 5/2023 |
| WO | 2023091424 A1 | 5/2023 |
| WO | 2023167866 A1 | 9/2023 |
| WO | 2023177718 A1 | 9/2023 |
| WO | 2024044277 A1 | 2/2024 |
| WO | 2024180503 A1 | 9/2024 |
| WO | 2025015198 A1 | 1/2025 |

OTHER PUBLICATIONS

U.S. Appl. No. 17/468,318, filed Sep. 7, 2021 Notice of Allowance dated Jan. 18, 2024.
U.S. Appl. No. 17/471,015, filed Sep. 9, 2021 Advisory Action dated Feb. 2, 2024.
U.S. Appl. No. 17/471,015, filed Sep. 9, 2021 Non-Final Office Action dated Mar. 28, 2024.
U.S. Appl. No. 17/534,099, filed Nov. 23, 2021 Non-Final Office Action dated Mar. 14, 2024.
U.S. Appl. No. 17/538,911, filed Nov. 30, 2021 Notice of Allowance dated Mar. 14, 2024.
U.S. Appl. No. 17/538,943, filed Nov. 30, 2021 Non-Final Office Action dated Jan. 30, 2024.
U.S. Appl. No. 17/684,180, filed Mar. 1, 2022 Advisory Action dated Apr. 4, 2024.
U.S. Appl. No. 17/684,180, filed Mar. 1, 2022 Final Office Action dated Jan. 18, 2024.
U.S. Appl. No. 17/684,180, filed Mar. 1, 2022 Non-Final Office Action dated May 8, 2024.
U.S. Appl. No. 17/722,111, filed Apr. 15, 2022 Final Office Action dated Jul. 12, 2024.
U.S. Appl. No. 17/722,151, filed Apr. 15, 2022 Non-Final Office Action dated Mar. 25, 2024.
U.S. Appl. No. 17/894,460, filed Aug. 24, 2022 Advisory Action dated Apr. 4, 2024.
U.S. Appl. No. 17/894,460, filed Aug. 24, 2022 Final Office Action dated Jan. 31, 2024.
U.S. Appl. No. 17/979,564, filed Nov. 2, 2022 Non-Final Office Action dated Jun. 5, 2024.
U.S. Appl. No. 18/238,281, filed Aug. 25, 2023 Non-Final Office Action dated Mar. 22, 2024.
U.S. Appl. No. 18/238,281, filed Aug. 25, 2023 Notice of Allowance dated Jul. 16, 2024.
PCT/US2022/025097 filed Apr. 15, 2021 International Preliminary Report on Patentability dated Oct. 26, 2023.
PCT/US2023/030970 filed Aug. 23, 2023 International Search Report and Written Opinion dated Oct. 30, 2023.
U.S. Appl. No. 17/468,318, filed Sep. 7, 2021 Advisory Action dated Nov. 6, 2023.
U.S. Appl. No. 17/471,015, filed Sep. 9, 2021 Final Office Action dated Oct. 12, 2023.
U.S. Appl. No. 17/534,099, filed Nov. 23, 2021 Advisory Action dated Dec. 8, 2023.
U.S. Appl. No. 17/534,099, filed Nov. 23, 2021 Final Office Action dated Sep. 29, 2023.
U.S. Appl. No. 17/538,911, filed Nov. 30, 2021 Advisory Action dated Nov. 22, 2023.
U.S. Appl. No. 17/722,111, filed Apr. 15, 2022 Non-Final Office Action dated Dec. 22, 2023.
U.S. Appl. No. 17/722,151, filed Apr. 15, 2022 Advisory Action dated Jan. 2, 2024.
U.S. Appl. No. 17/722,151, filed Apr. 15, 2022 Final Office Action dated Nov. 6, 2023.
U.S. Appl. No. 17/894,460, filed Aug. 24, 2022 Non-Final Office Action dated Nov. 6, 2023.
EP 20866520.8 filed Apr. 5, 2022 Extended European Search Report dated Aug. 22, 2023.
PCT/US2023/014143 filed Feb. 28, 2023 International Search Report and Written Opinion dated Jun. 12, 2023.
U.S. Appl. No. 17/468,318, filed Sep. 7, 2021 Final Office Action dated Sep. 8, 2023.
U.S. Appl. No. 17/538,911, filed Nov. 30, 2021 Final Office Action dated Sep. 13, 2023.
U.S. Appl. No. 17/684,180, filed Mar. 1, 2022 Non-Final Office Action dated Jul. 28, 2023.
U.S. Appl. No. 17/722,151, filed Apr. 15, 2022 Non-Final Office Action dated Sep. 7, 2023.
Lu Zhenyu et al."Recent advances in 5 robot-assisted echography combining perception control and cognition." Cognitive Computation and Systems the Institution of Engineering and Technology, Michael Faraday House, Six Hills Way, Stevenage Herts. SG1 2AY UK vol. 2 No. 3 Sep. 2, 2020 (Sep. 2, 2020).
Pagoulatos, N. et al. "New spatial localizer based on fiber optics with applications in 3D ultrasound imaging" Proceeding of Spie, vol. 3976 (Apr. 18, 2000; Apr. 18, 2000).
PCT/US2021/049294 filed Sep. 7, 2021 International Search Report and Written Opinion dated Dec. 8, 2021.
PCT/US2021/049712 filed Sep. 9, 2021 International Search Report and Written Opinion dated Dec. 14, 2021.
PCT/US2021/060622 filed Nov. 23, 2021 International Search Report and Written Opinion dated Mar. 3, 2022.
PCT/US2021/061267 filed Nov. 30, 2021 International Search Report and Written Opinion dated Mar. 9, 2022.
PCT/US2021/061276 filed Nov. 30, 2021 International Search Report and Written Opinion dated Mar. 9, 2022.
PCT/US2022/025082 filed Apr. 15, 2022 International Search Report and Written Opinion dated Jul. 11, 2022.
PCT/US2022/025097 filed Apr. 15, 2022 International Search Report and Written Opinion dated Jul. 8, 2022.
PCT/US2022/048716 filed Nov. 2, 2022 International Search Report and Written Opinion dated Feb. 24, 2023.
PCT/US2022/048722 filed Nov. 2, 2022 International Search Report and Written Opinion dated Feb. 24, 2023.
PCT/US2022047727 filed Oct. 25, 2022 International Search Report and Written Opinion dated Jan. 25, 2023.
Sebastian Vogt: "Real-Time Augmented Reality for Image-Guided Interventions", Oct. 5, 2009, XPO55354720, Retrieved from the Internet: URL: https://opus4.kobv.de/opus4-fau/frontdoor/deliver/index/docld/1235/file/SebastianVogtDissertation.pdf.
U.S. Appl. No. 15/650,474, filed Jul. 14, 2017 Final Office Action dated Jun. 2, 2020.
U.S. Appl. No. 15/650,474, filed Jul. 14, 2017 Non-Final Office Action dated Dec. 16, 2019.

(56) References Cited

OTHER PUBLICATIONS

U.S. Appl. No. 15/650,474, filed Jul. 14, 2017 Notice of Allowance dated Dec. 11, 2020.
U.S. Appl. No. 15/650,474, filed Jul. 14, 2017 Notice of Allowance dated Mar. 1, 2021.
U.S. Appl. No. 17/020,476, filed Sep. 14, 2020 Advisory Action dated Aug. 19, 2022.
U.S. Appl. No. 17/020,476, filed Sep. 14, 2020 Final Office Action dated Jan. 5, 2023.
U.S. Appl. No. 17/020,476, filed Sep. 14, 2020 Final Office Action dated Jun. 9, 2022.
U.S. Appl. No. 17/020,476, filed Sep. 14, 2020 Non-Final Office Action dated Feb. 9, 2022.
U.S. Appl. No. 17/020,476, filed Sep. 14, 2020 Non-Final Office Action dated Sep. 23, 2022.
U.S. Appl. No. 17/471,015, filed Sep. 9, 2021 Non-Final Office Action dated Aug. 16, 2022.
U.S. Appl. No. 17/538,911, filed Nov. 30, 2021 Non-Final Office Action dated Mar. 2, 2023.
William F Garrett et al: "Real-time incremental visualization of dynamic ultrasound volumes using parallel BSP trees", Visualization '96. Proceedings, IEEE, NE, Oct. 27, 1996, pp. 235-ff, XPO58399771, ISBN: 978-0-89791-864-0 abstract, figures 1-7, pp. 236-240.
PCT/US2022/049983 filed Nov. 15, 2022 International Search Report and Written Opinion dated Mar. 29, 2023.
PCT/US2023/015266 filed Mar. 15, 2023 International Search Report and Written Opinion dated May 25, 2023.
Saxena Ashish et al Thermographic venous blood flow characterization with external cooling stimulation Infrared Physics and Technology Elsevier Science GB vol. 90 Feb. 9, 2018 Feb. 9, 2018 pp. 8-19 XP085378852.
U.S. Appl. No. 17/020,476, filed Sep. 14, 2020 Notice of Allowance dated Apr. 28, 2022.
U.S. Appl. No. 17/468,318, filed Sep. 7, 2021 Non-Final Office Action dated Apr. 12, 2023.
U.S. Appl. No. 17/471,015, filed Sep. 9, 2021 Non-Final Office Action dated Mar. 30, 2023.
U.S. Appl. No. 17/534,099, filed Nov. 23, 2021 Non-Final Office Action dated Mar. 31, 2023.
U.S. Appl. No. 17/684,180, filed Mar. 1, 2022 Restriction Requirement dated May 19, 2023.
PCT/US2022/045372 filed Sep. 30, 2022 International Search Report and Written Opinion dated Jan. 14, 2023.
PCT/US2024/037647 filed Jul. 11, 2024 International Search Report and Written Opinion dated Oct. 16, 2024.
Thermographic venous blood flow characterization with external cooling stimulation (Year: 2018).
U.S. Appl. No. 17/471,015, filed Sep. 9, 2021 Notice of Allowance dated Oct. 29, 2024.
U.S. Appl. No. 17/534,099, filed Nov. 23, 2021 Notice of Allowance dated Sep. 18, 2024.
U.S. Appl. No. 17/538,943, filed Nov. 30, 2021 Notice of Allowance dated Aug. 14, 2024.
U.S. Appl. No. 17/684,180, filed Mar. 1, 2022 Final Office Action dated Sep. 23, 2024.
U.S. Appl. No. 17/722,111, filed Apr. 15, 2022 Advisory Action dated Oct. 23, 2024.
U.S. Appl. No. 17/722,151, filed Apr. 15, 2022 Final Office Action dated Sep. 20, 2024.
U.S. Appl. No. 17/894,460, filed Aug. 24, 2022 Non-Final Office Action dated Sep. 25, 2024.
U.S. Appl. No. 17/957,562, filed Sep. 30, 2022 Non-Final Office Action dated Jun. 20, 2024.
U.S. Appl. No. 17/979,564, filed Nov. 2, 2022 Final Office Action dated Oct. 18, 2024.
U.S. Appl. No. 17/979,601, filed Nov. 2, 2022 Non-Final Office Action dated Aug. 20, 2024.
U.S. Appl. No. 17/987,698, filed Nov. 15, 2022 Non-Final Office Action dated Sep. 20, 2024.
U.S. Appl. No. 17/684,180, filed Mar. 1, 2022 Advisory Action dated Dec. 27, 2024.
U.S. Appl. No. 17/684,180, filed Mar. 1, 2022 Non-Final Office Action dated Jan. 17, 2025.
U.S. Appl. No. 17/722,111, filed Apr. 15, 2022 Notice of Allowance dated Dec. 18, 2024.
U.S. Appl. No. 17/722,151, filed Apr. 15, 2022 Advisory Action dated Dec. 27, 2024.
U.S. Appl. No. 17/894,460, filed Aug. 24, 2022 Final Office Action dated Dec. 31, 2024.
U.S. Appl. No. 17/957,562, filed Sep. 30, 2022 Advisory Action dated Feb. 12, 2025.
U.S. Appl. No. 17/957,562, filed Sep. 30, 2022 Final Office Action dated Nov. 27, 2024.
U.S. Appl. No. 17/973,171, filed Oct. 25, 2022 Non-Final Office Action dated Dec. 6, 2024.
U.S. Appl. No. 17/979,564, filed Nov. 2, 2022 Advisory Action dated Jan. 17, 2025.
U.S. Appl. No. 17/979,601, filed Nov. 2, 2022 Advisory Action dated Feb. 11, 2025.
U.S. Appl. No. 17/979,601, filed Nov. 2, 2022 Final Office Action dated Dec. 5, 2024.
U.S. Appl. No. 17/987,698, filed Nov. 15, 2022 Advisory Action dated Feb. 21, 2025.
U.S. Appl. No. 17/987,698, filed Nov. 15, 2022 Final Office Action dated Dec. 13, 2024.
U.S. Appl. No. 18/121,802, filed Mar. 15, 2023 Non-Final Office Action dated Dec. 16, 2024.
U.S. Appl. No. 18/674,601, filed May 24, 2024 Non-Final Office Action dated Jan. 7, 2025.
Chen et al.,3D near infrared and ultrasound imaging of peripheral blood vessels for real-time localization and needle guidance. InMedical Image Computing and Computer-Assisted Intervention-MICCAI 2016 (pp. 388-396) (Year: 2016).
U.S. Appl. No. 17/684,180, filed Mar. 1, 2022 Final Office Action dated May 29, 2025.
U.S. Appl. No. 17/722,151, filed Apr. 15, 2022 Final Office Action dated Jul. 11, 2025.
U.S. Appl. No. 17/722,151, filed Apr. 15, 2022 Non-Final Office Action dated Mar. 21, 2025.
U.S. Appl. No. 17/894,460, filed Aug. 24, 2022 Advisory Action dated Mar. 13, 2025.
U.S. Appl. No. 17/957,562, filed Sep. 30, 2022 Examiner's Answer dated Jun. 16, 2025.
U.S. Appl. No. 17/973,171, filed Oct. 25, 2022 Advisory Action dated Jun. 30, 2025.
U.S. Appl. No. 17/973,171, filed Oct. 25, 2022 Final Office Action dated Apr. 3, 2025.
U.S. Appl. No. 17/979,564, filed Nov. 2, 2022 Examiner's Answer dated May 30, 2025.
U.S. Appl. No. 17/979,601, filed Nov. 2, 2022 Notice of Allowance dated Mar. 27, 2025.
U.S. Appl. No. 17/987,698, filed Nov. 15, 2022 Non-Final Office Action dated May 23, 2025.
U.S. Appl. No. 18/121,802, filed Mar. 15, 2023 Notice of Allowance dated Jun. 5, 2025.
U.S. Appl. No. 18/221,318, filed Jul. 12, 2023 Non-Final Office Action dated Jun. 23, 2025.
U.S. Appl. No. 18/221,318, filed Jul. 12, 2023 Restriction Requirement dated Mar. 28, 2025.
U.S. Appl. No. 18/674,601, filed May 24, 2024 Notice of Allowance dated Mar. 26, 2025.

\* cited by examiner

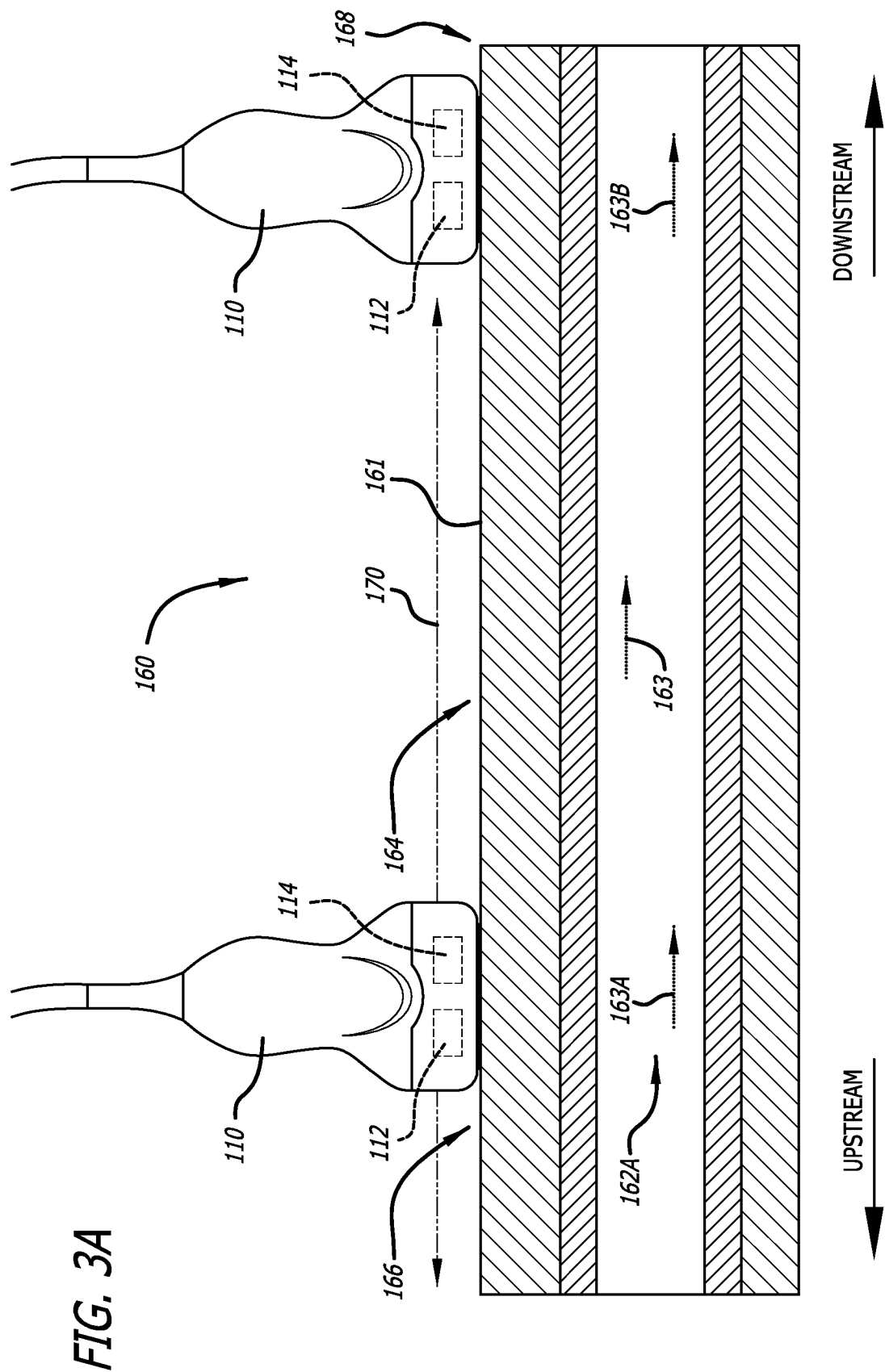

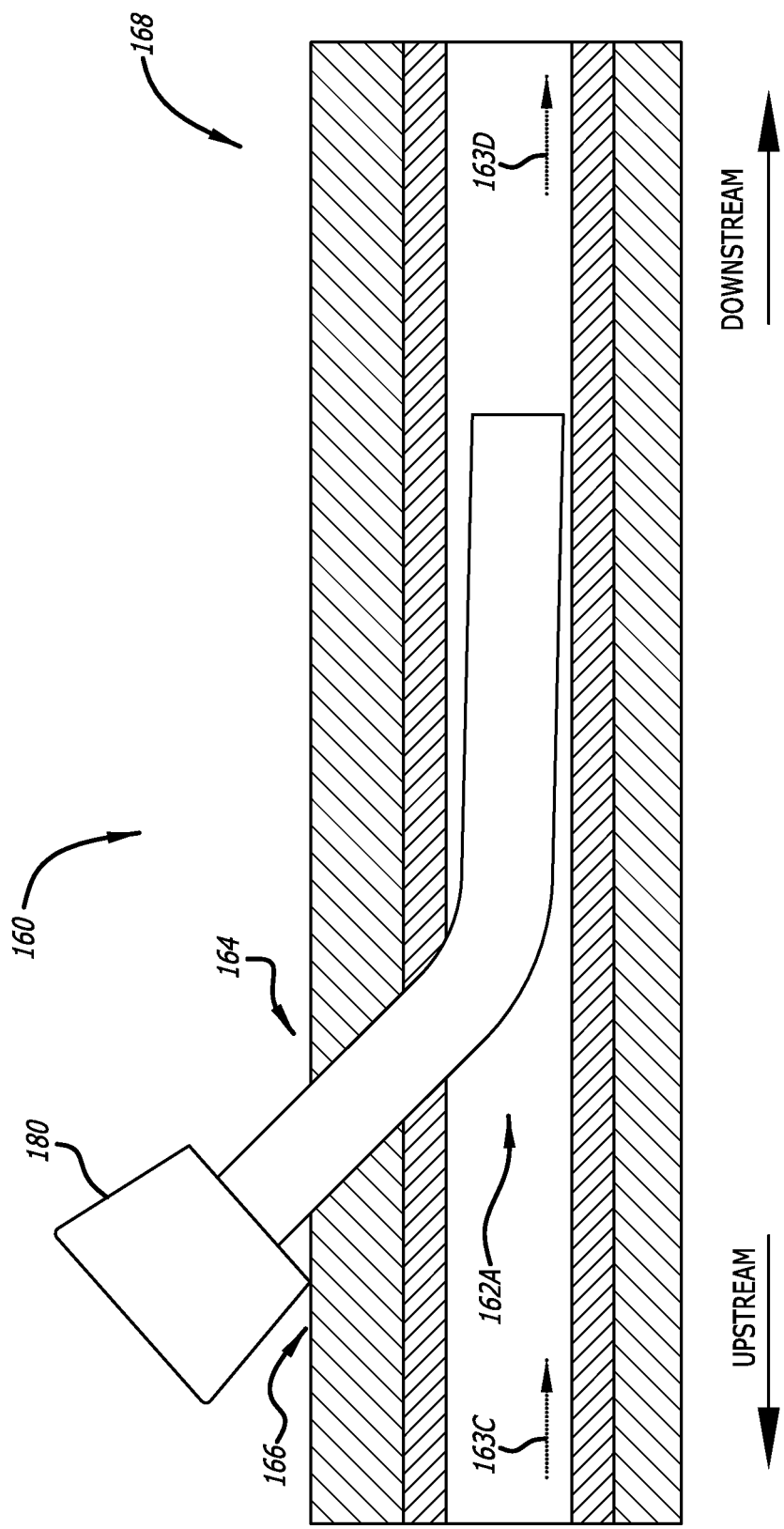

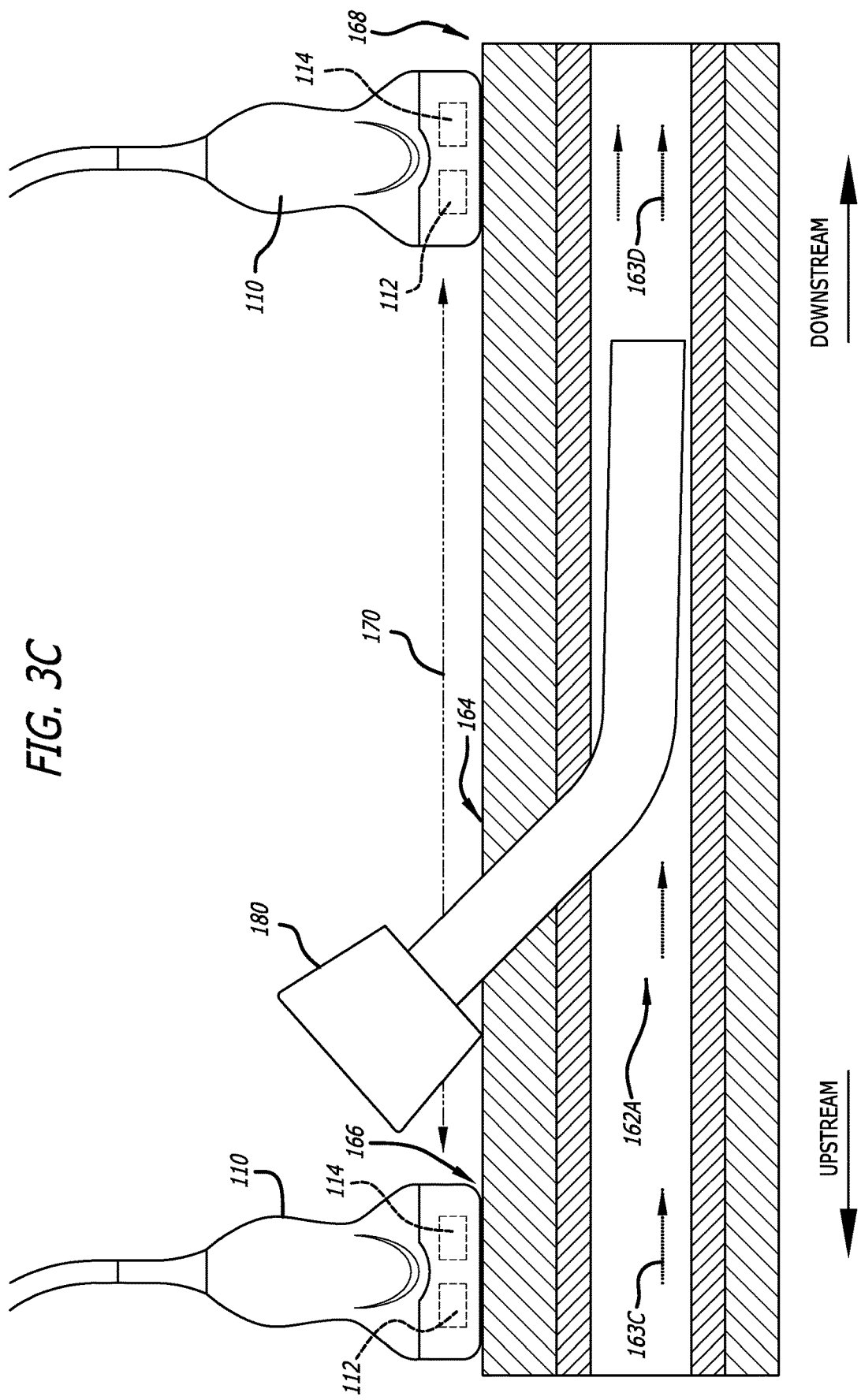

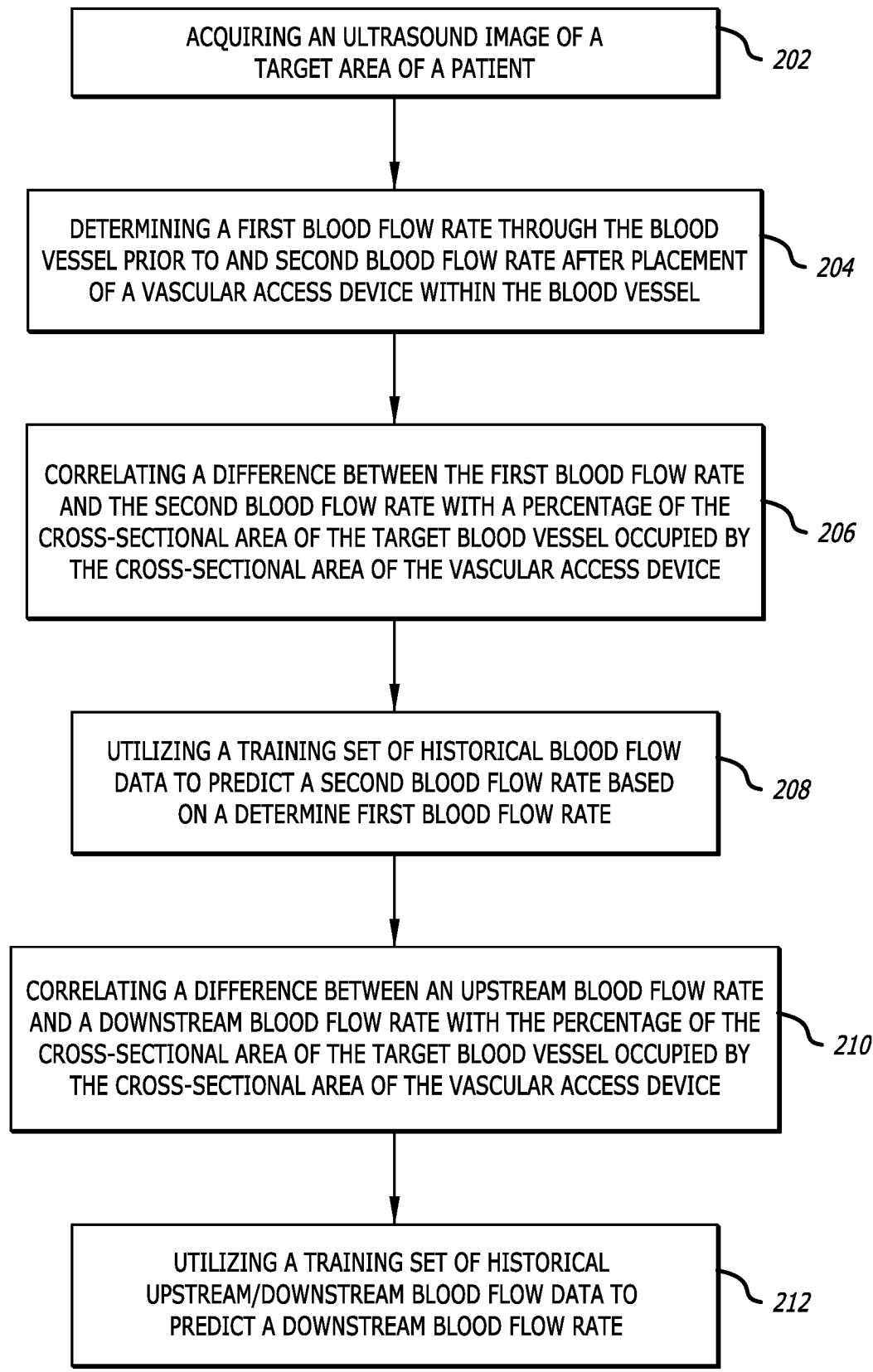

ULTRASOUND IMAGING SYSTEM

PRIORITY

This application is a continuation-in-part of U.S. patent application Ser. No. 17/684,180, filed Mar. 1, 2022, which is incorporated by reference in its entirety into this application.

BACKGROUND

Current methods for placing a vascular access device include placing a vascular access device occupying no more than 45% of a target vessel. Ultrasound imaging systems are used to detect vascular access device occupancy within the target vessel. However, these methods do not ensure that blood flow through the vessel is not compromised once the vascular access device is placed within the vessel. It would be beneficial to the clinician and the patient to have an ultrasound imaging system that may be used to image the target vessel, detect occupancy of the vascular access device within the target vessel, and assess blood flow through the target vessel after the vascular access device has been placed. Disclosed herein is an ultrasound imaging system and method of use that address the foregoing.

SUMMARY

Disclosed herein is an ultrasound imaging system an ultrasound imaging system that, according to some embodiments, includes an ultrasound probe, where the ultrasound probe includes an ultrasound array configured to acquire an ultrasound image of a target area of a patient and a doppler array configured to determine a blood flow rate through a region of interest within the ultrasound image. The ultrasound imaging system further includes a console coupled with the ultrasound array and the doppler array, and the console includes one or more processors and a memory having logic stored thereon that, when executed by the one or more processors, performs operations that include acquiring an ultrasound image of the target area and identifying the region of interest within the ultrasound image.

In some embodiments, identifying the region of interest includes selecting of the region of interest by the clinician.

In some embodiments, the operations further include (i) storing data composed of multiple corresponding combinations of the ultrasound image and the region of interest selected by the clinician as acquired during operation of the ultrasound imaging system to define a training set of region of interest data and (ii) performing operations on the training set of region of interest data to define a suggested region of interest within an acquired ultrasound image. In some embodiments, the operations further include overlaying on the ultrasound image an indication of the suggested region of interest. In some embodiments, identifying the region of interest includes automatically identifying the region of interest based on the training set of region of interest data.

In some embodiments, the region of interest includes a target blood vessel and the blood flow rate through a region of interest includes a blood flow rate through the target blood vessel. In some embodiments, the operations further include determining a cross-sectional area of the target blood vessel from the ultrasound image.

In some embodiments, the ultrasound image includes a vascular access device disposed within the target blood vessel. In some embodiments, the operations further include determining the cross-sectional area of the vascular access device from the ultrasound image. In some embodiments, the operations further include determining a percentage of the cross-sectional area of the target blood vessel occupied by the cross-sectional area of the vascular access device.

In some embodiments, the operations further include determining the blood flow rate through the target blood vessel with the vascular access device absent from the target blood vessel to define a first blood flow rate. In some embodiments, the operations further include determining the blood flow rate through the target blood vessel with the vascular access device present within the target blood vessel to define a second blood flow rate. In some embodiments, the operations further include calculating a percentage of the first blood flow rate defined by the second blood flow rate and depicting the percentage of the first blood flow rate on the display.

In some embodiments, the operations further include (i) storing data composed of multiple corresponding combinations of the target blood vessel cross-sectional area, the vascular access device cross-sectional area, the first blood flow rate, and the second blood flow rate as acquired during operation of the ultrasound imaging system to define a training set of historical blood flow data; and (ii) performing operations on the training set of historical blood flow data to predict a second blood flow rate with the vascular access device present within the target blood vessel based on a determined first blood flow rate with the vascular access device absent from the target blood vessel. In some embodiments, the operations further include depicting the predicted second blood flow rate on the display.

In some embodiments, the operations further include determining the blood flow rate through the target blood vessel with the vascular access device present within the target blood vessel at a location along the target blood vessel upstream of the vascular device to define an upstream blood flow rate. In some embodiments, the operations further include determining the blood flow rate through the target blood vessel with the vascular access device present within the target blood vessel at a location along the target blood vessel downstream of the vascular device to define a downstream blood flow rate.

In some embodiments, the operations further include (i) storing data composed of multiple corresponding combinations of the target blood vessel cross-sectional area, the vascular access device cross-sectional area, the upstream blood flow rate, and the downstream blood flow rate as acquired during operation of the ultrasound imaging system to define a training set of historical upstream/downstream blood flow data; and (ii) performing operations on the training set of historical upstream/downstream blood flow data to predict a downstream blood flow rate based on a determined upstream blood flow rate. In some embodiments, the operations further include depicting the predicted downstream blood flow rate on the display.

Also disclosed herein is a method of assessing a blood flow rate through a blood vessel that, according to some embodiments, includes (i) acquiring an ultrasound image of a target area of a patient via an ultrasound array of an ultrasound probe; (ii) identifying a region of interest within the ultrasound image, where the region of interest includes the blood vessel; (iii) determining a blood flow rate through the blood vessel via a doppler array of the ultrasound probe prior to placement of a vascular access device within the blood vessel to define a first blood flow rate; (iv) determining the blood flow rate through the blood vessel via the doppler array after placement of the vascular access device within the blood vessel to define a second blood flow rate;

and (v) calculating a difference between the first blood flow rate and the second blood flow rate.

In some embodiments, the method further includes (i) acquiring the ultrasound image with the vascular access device disposed within the blood vessel; (ii) determining a cross-sectional area of the target blood vessel from the ultrasound image; (iii) determining a cross-sectional area of the vascular access device from the ultrasound image; (iv) determining a percentage of the cross-sectional area of the target blood vessel occupied by the cross-sectional area of the vascular access device; and (v) correlating the difference between the first blood flow rate and the second blood flow rate with the percentage of the cross-sectional area of the target blood vessel occupied by the cross-sectional area of the vascular access device.

In some embodiments, the method further includes (i) storing data composed of multiple corresponding combinations of the target blood vessel cross-sectional area, the vascular access device cross-sectional area, the first blood flow rate, and the second blood flow rate to define a training set of historical blood flow data; and (ii) performing operations on the training set of historical blood flow data to predict a second blood flow rate with the vascular access device present within the target blood vessel based on a determined first blood flow rate with the vascular access device absent from the target blood vessel.

In some embodiments, the method further includes (i) determining the blood flow rate through the target blood vessel with the vascular access device present within the target blood vessel at a location along the target blood vessel upstream of the vascular device to define an upstream blood flow rate; (ii) determining the blood flow rate through the target blood vessel with the vascular access device present within the target blood vessel at a location along the target blood vessel downstream of the vascular device to define a downstream blood flow rate; (iii) calculating a difference between the upstream blood flow rate and the downstream blood flow rate; and (iv) correlating the difference between the upstream blood flow rate and the downstream blood flow rate with the percentage of the cross-sectional area of the target blood vessel occupied by the cross-sectional area of the vascular access device.

In some embodiments, the method further includes (i) storing data composed of multiple corresponding combinations of the target blood vessel cross-sectional area, the vascular access device cross-sectional area, the upstream blood flow rate, and the downstream blood flow rate to define a training set of historical upstream/downstream blood flow data; and (ii) performing operations on the training set of historical upstream/downstream blood flow data predict a downstream blood flow rate based on a determined upstream blood flow rate.

These and other features of the concepts provided herein will become more apparent to those of skill in the art in view of the accompanying drawings and following description, which describe particular embodiments of such concepts in greater detail.

DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which:

FIGS. 3A-3C illustrate a various view of the ultrasound probe in use with target area shown in cross section depicting an exemplary method of determining fluid flow through a target blood vessel before and after vascular access device insertion, in accordance with some embodiments;

FIG. 5 illustrates a flow chart of an exemplary method of assessing a blood flow rate within a blood vessel, in accordance with some embodiments.

DESCRIPTION

Figure 1:
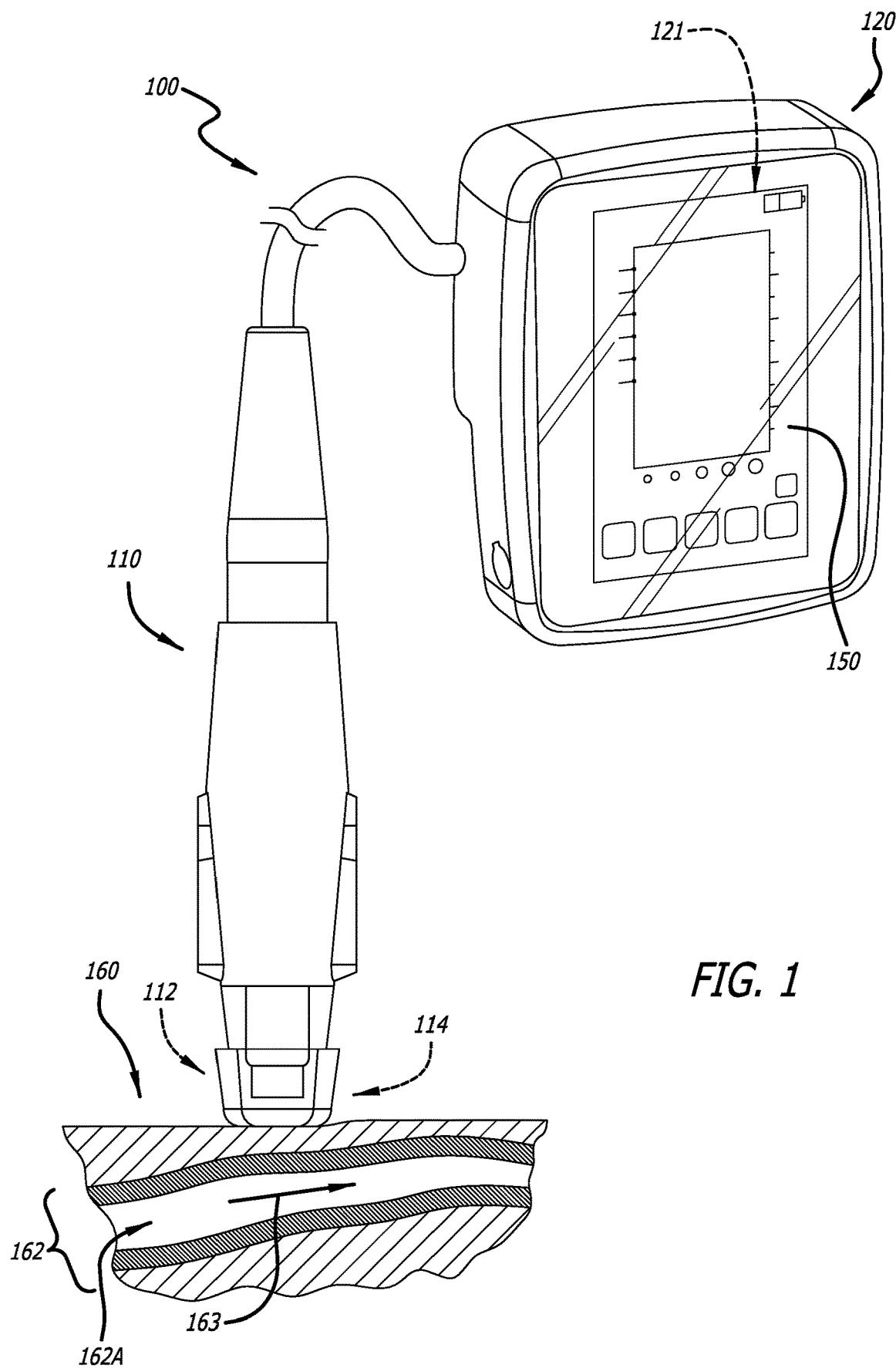
FIG. 1 illustrates a perspective view of an ultrasound imaging system, in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

The term "logic" may be representative of hardware, firmware or software that is configured to perform one or more functions. As hardware, the term logic may refer to or include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the term logic may refer to or include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic may be stored in persistent storage.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method. Additionally, all embodiments disclosed herein are combinable and/or interchangeable unless stated otherwise or such combination or interchange would be contrary to the stated operability of either embodiment.

The phrases "connected to," "coupled to/with," and "in communication with" refer to any form of interaction between two or more entities, including but not limited to mechanical, electrical, magnetic, electromagnetic, fluid, and thermal interaction. Two components may be coupled to each other even though they are not in direct contact with each other. For example, two components may be coupled to each other through an intermediate component.

Unless defined otherwise, all technical and scientific terms used herein have the same meaning as commonly understood by those of ordinary skill in the art.

FIG. 1 illustrates a perspective view of an ultrasound imaging system 100, in accordance with some embodiments. The ultrasound imaging system 100 generally includes an ultrasound probe 110 coupled with a system module 120. In some embodiments, the system module 120 may be included or be coupled with a display 150 configured to render an ultrasound image, icons, data or any other suitable information. The ultrasound imaging system 100 further includes a console 121 which may be included (totally or partially) within the system module 120 as illustrated and/or the ultrasound probe 110, where the console 121 includes logic that governs the operation of the ultrasound imaging system 100.

The ultrasound probe 110 includes an ultrasound array 112, where the ultrasound array 112 includes a number of ultrasound transducers configured (e.g., arranged in an array) to obtain an ultrasound image (or more than one ultrasound image) of anatomic elements, e.g., blood vessels. In the illustrated embodiment, the ultrasound image includes the region of interest 162 (e.g., the target blood vessel 162A) disposed within a target area 160 of a patient. As such, during use, a clinician may place the ultrasound probe 110 over the target area 160 so that the ultrasound probe 110 can (by way of the ultrasound array 112) obtain the ultrasound image of the anatomic elements disposed within a target area 160. In some embodiments, the ultrasound array 112 in concert with the logic may be configured to capture the ultrasound image including the region of interest 162 within a target area 160 and communicate the ultrasound image to the system module 120 for depiction on the display 150. Furthermore, the ultrasound array 112, in accordance with the logic may be configured to obtain geometric data/information pertaining to the anatomical elements, such as a cross-sectional area of the target blood vessel 162A, for example. As such, during use, a clinician may place the ultrasound probe 110 over the target area 160 so that the ultrasound probe 110 can (by way of the ultrasound array 112) obtain the ultrasound image of the anatomic elements disposed within a target area 160 including geometric data/information pertaining to the anatomical elements.

The ultrasound probe 110 further includes a doppler array 114, where the doppler array 114 includes a number of ultrasound transducers configured (e.g., arranged in an array) to determine a motion of anatomic elements or portions thereof within the target area 160 via the doppler effect. For example, in the illustrated embodiment, the doppler array 114 may determine a motion of blood (e.g., a fluid flow rate 163) within the target blood vessel 162A.

By way of summary, the ultrasound system 100 may, by virtue of the ultrasound array 112 and the doppler array 144, determine a fluid flow rate 163 (e.g. a volumetric flow rate of blood) within the target blood vessel 162A. As such, the clinician may apply the ultrasound probe 110 to the patient at a defined target area 160 and obtain the fluid flow rate 163 within the target blood vessel 162A.

In some embodiments, the ultrasound array 112 may be configured to be operated at the same time as the doppler array 114, or the ultrasound array 112 may be continuously running and the doppler array 114 may be configured to be selectively activated, depending on the clinician's imaging needs.

Figure 2:
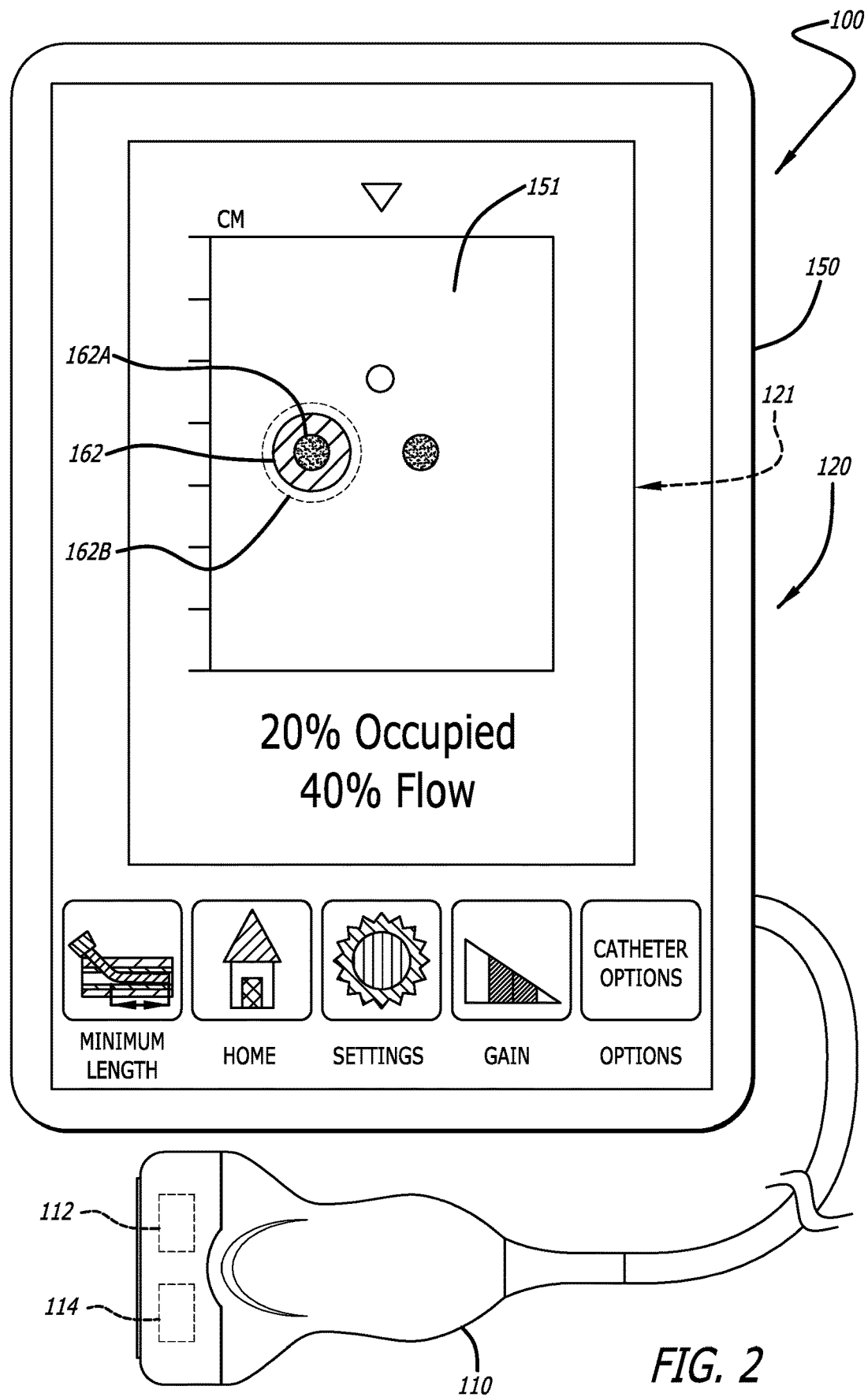
FIG. 2 illustrates a perspective view of a display of the ultrasound imaging system, in accordance with some embodiments.

FIG. 2 illustrates a perspective view of the display 150 of the ultrasound imaging system 100, in accordance with some embodiments. In some embodiments, the display 150 may include a graphical user interface (GUI) having a touch screen. The display 150 may be configured to depict an ultrasound image 151 captured by the ultrasound array 112. In some embodiments, the display 150 may be configured to overlay the data received from the doppler array 114 onto the ultrasound image 151. In some embodiments, the clinician may select, on the display 150, region of interest 162 which may include the target blood vessel 162A from a plurality of blood vessels depicted within the ultrasound image 151. In some embodiments, when the target blood vessel 162A is selected, the display 150 may display the ultrasound image of the target blood vessel 162A including the fluid flow rate 163 as acquired via the doppler array 114, as will be described in more detail herein. In some embodiments, the display 150 may be configured to portray a variety of icons including a target vessel occupancy icon, a fluid flow rate icon, a region of interest icon, or the like. In some embodiments, the variety of icons may include different shapes, different colors, or different sizes. In some embodiments, the variety of icons may change in response to data received by the system module 120. For example, in some embodiments, the variety of icons may change in response to an increase or decrease in fluid flow rate 163. In some embodiments, the doppler array 114 may be activated and deactivated from the display 150 or from the ultrasound probe 110.

FIGS. 3A-3C are various side views of the ultrasound probe 110 illustrating an exemplary method of determining the fluid flow rate 163 through the target blood vessel 162A before and after insertion of a vascular access device 180, in accordance with some embodiments. Referring to FIG. 3A, the ultrasound probe 110 may be operatively coupled with a skin surface 161 over the target area 160. The ultrasound array 112 may be used to capture the ultrasound image 151 including the target blood vessel 162A. The doppler array 114 may be used to determine the blood flow rate 163 through the target blood vessel 162A. In some embodiments, the ultrasound probe 110 may be configured to capture the ultrasound image 151 including the target blood vessel 162A at positions along a length 170, wherein the length 170 includes an insertion site 164 (shown absent a vascular device disposed therein) in accordance with a placement location of the ultrasound probe 110. In some embodiments, the ultrasound probe 110 may be configured to image the target blood vessel 162A at a location 166 upstream of the insertion site 164 and at a location 168 downstream the insertion site 164. Further, the ultrasound probe 110 may be coupled with the skin surface 161 at a location 166 upstream of the insertion site 164 to determine the fluid flow rate 163A upstream of the insertion site 164. Similarly, the ultrasound probe 110 may be coupled with the skin surface 161 at a location 168 downstream of the insertion site 164 to determine the fluid flow rate 163B downstream of the insertion site 164.

FIG. 3B illustrates a vascular access device 180 inserted within the target blood vessel 162A. In the illustrated instance, a portion of the vascular access device 180 resides within the target blood vessel 162A and as such, the vascular access device 180 may alter (i.e., impede or reduce) the fluid flow rate 163 through the target blood vessel 162A. As such, the fluid flow rates 163C, 163D upstream and downstream of the vascular access device 180 may be different than the fluid flow rates 163A, 163B of FIG. 3A. In some embodiments, a length of the vascular access device 180 disposed within the target blood vessel 162A may be relatively short (e.g., a few centimeters) and as such, the effect of the presence of the vascular access device 180 on the fluid flow rates 163A, 163B may be substantially equal, i.e., the fluid flow rate upstream of the vascular access device 180 may be substantially the same as the fluid flow rate downstream of the vascular access device 180. In other embodiments, the length of the vascular access device 180 disposed within the target blood vessel 162A may be relatively long (e.g., 10 centimeters, 20 centimeters or longer). In such embodiments, the target blood vessel 162A include junctures with other blood vessel along the length of the vascular access device 180, and as such, the effect of the presence of the vascular access device 180 on the fluid flow rates 163A, 163B may be different.

Referring to FIG. 3C, with the vascular access device 180 placed within the target blood vessel 162A, the target blood vessel 162A may be imaged at positions along the length 170 by the ultrasound probe 110, including at the location 166 upstream of the vascular access device 180 and the location 168 downstream of the vascular access device 180. The doppler array 114 may be used to determine the fluid flow rate 163C upstream of the vasculature access device 180 and the fluid flow rate 163D downstream of the vasculature access device 180. In some embodiments, the logic of the console 121 may be configured to process the determined fluid flow rates 163A, 163B, 163C and 163D to assess the impact of the placement of the vascular access device 180 within the target blood vessel 162A. For example, the logic of the console 121 may be configured to determine a difference between (i) the fluid flow rates 163A and 163C, (ii) the fluid flow rates 163A and 163D, (iii) the fluid flow rates 163B and 163D and/or (iv) the fluid flow rates 163C and 163D.

Figure 4:
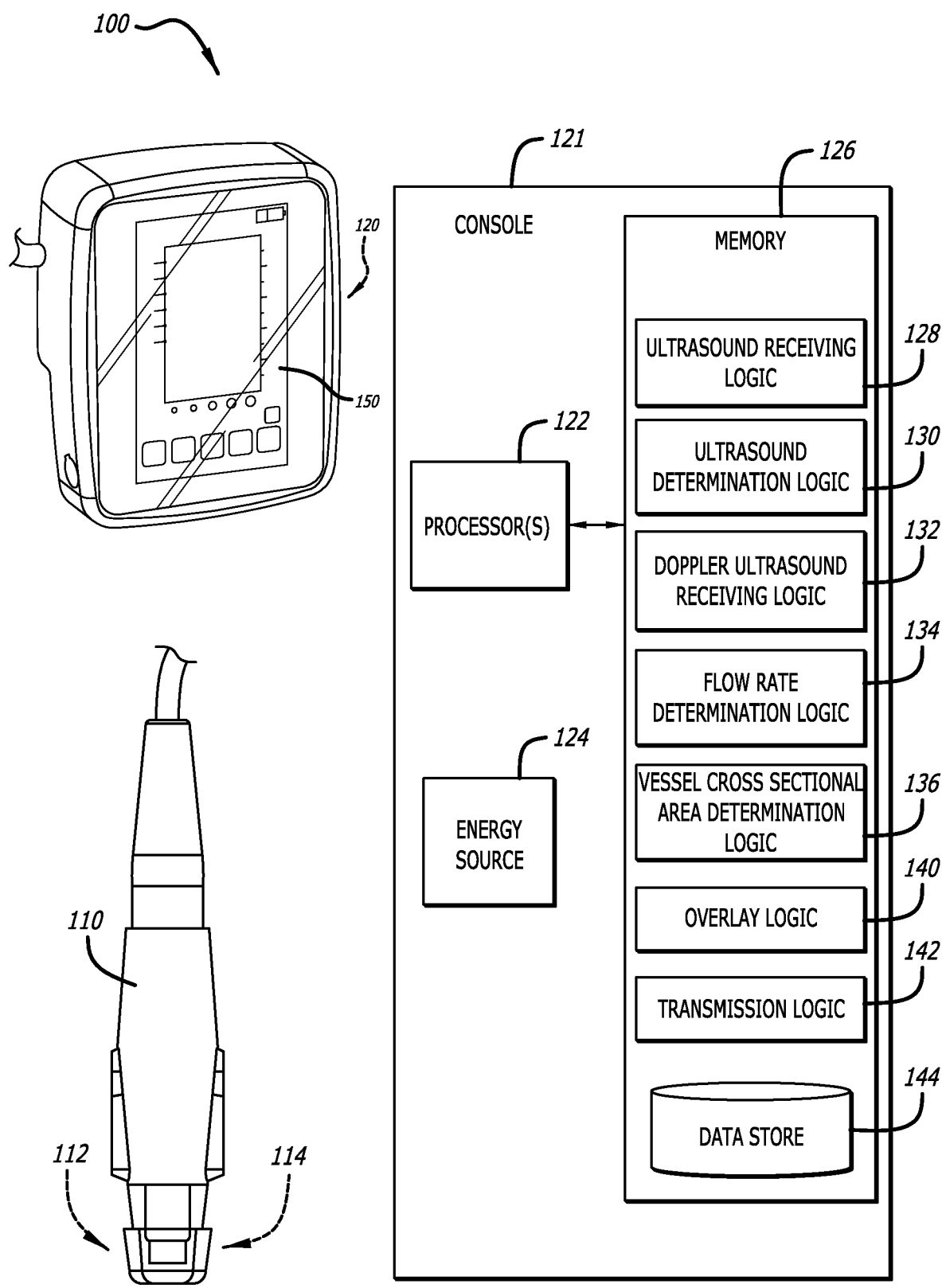
FIG. 4 illustrates a block diagram of a console of the ultrasound imaging system, in accordance with some embodiments.

FIG. 4 illustrates a block diagram of the console 121, in accordance with some embodiments. The console 121 is in communication with each of the ultrasound probe 110 and the display 150. In some embodiments, the console 121 may be coupled to the ultrasound probe 110 and/or the display 150 via a wired connection. In other embodiments, console 121 may be coupled to the ultrasound probe 110 and/or the display 150 via a wireless connection. The console 121 may include one or more processors 122, an energy source 124, a non-transitory computer-readable medium ("memory") 126, and a number (e.g., 1, 2, 3, or more) of logic modules. In some embodiments, the logic modules may include one or more of ultrasound receiving logic 128, ultrasound determination logic 130, doppler array receiving logic 132, flow rate determination logic 134, vessel cross-sectional area determination logic 136, overlay logic 140, a transmission logic 142, and a data store 144.

The ultrasound receiving logic 128 may be generally configured to receive the ultrasound image 151 captured by the ultrasound array 112 of the ultrasound probe 110. In some embodiments, the ultrasound receiving logic 128 may be configured to generate a time stamp to be associated with the ultrasound image 151.

The ultrasound determination logic 130 may be configured to identify the region of interest 162 (e.g., the target blood vessel 162A) within the ultrasound image 151. For example, the ultrasound determination logic 130 may identify the region of interest 162 in accordance with a selection by the clinician. In other words, the clinician may, by way of the display 150 select a portion of the ultrasound image 151 or an object within the ultrasound image such as the target blood vessel 162A to define the region of interest 162.

In some embodiments, the ultrasound determination logic 130 may be configured to automatically determine the region of interest 162 absent a selection by the clinician. By way of example, the ultrasound determination logic 130 may store multiple acquired ultrasound images 151 and the corresponding selected regions of interest 162 within the ultrasound images 151 as data pairs during use to define a training set of region of interest data. The ultrasound determination logic 130 may then perform operations on the training set of region of interest data (e.g., statistical operations) to define a suggested region of interest 162 within an acquired ultrasound image 151. In some embodiments, the ultrasound determination logic 130 overlays an indication 162B on the ultrasound image 151 to indicate the suggested region of interest. In some embodiments, the ultrasound determination logic 130 may automatically identify the region of interest 162 based on the training set of region of interest data. In some embodiments, the ultrasound determination logic 130 may continue to store additional acquired ultrasound images 151 and the corresponding selected regions of interest 162 within the ultrasound images 151 as additional data pairs of the training set of region of interest data to increase a confidence regarding the suggested region of interest.

In some embodiments, the vessel cross-sectional area determination logic 136 may be configured to determine dimensions of objects depicted within the ultrasound image 151. For example, the vessel cross-sectional area determination logic 136 may be configured to determine a cross-sectional area of the target blood vessel 162A from the ultrasound image 151. In some instances, the ultrasound image 151 may include the vascular access device 180 disposed within the target blood vessel 162A. As such, in some embodiments, the vessel cross-sectional area determination logic 136 may be configured to determine a cross-sectional area of the vascular access device 180. Having determined the cross-sectional area of the target blood vessel 162A and the cross-sectional area of the vascular access device 180, the vessel cross-sectional area determination logic 136 may be configured to calculate a percentage of the cross-sectional area of the target blood vessel occupied by the cross-sectional area of the vascular access device 180. In some embodiments, the memory 126 may include a data base of vascular access devices, where the data base of vascular access devices includes the cross-sectional area of each vascular access device within the data base of vascular access. As such, in some embodiments, the vessel cross-sectional area determination logic 136 may obtain the cross-sectional area of the vascular access device 180 from data base of vascular access devices in leu of determining the cross-sectional area of the vascular access device 180 via the ultrasound image 151.

The doppler array receiving logic 132 may be generally configured to receive flow rate data (e.g., doppler ultrasound values pertaining to motion) from the doppler array 114 including the fluid flow rate 163 through the region of interest 162, e.g., the through target blood vessel 162A. The flow rate determination logic 134 may be configured to determine the fluid flow rate 163 from the flow rate data acquired from the doppler array 114.

The flow rate determination logic 134 may determine the fluid flow rate 163 through the target blood vessel 162A at a different points in time. For example, the flow rate determination logic 134 may determine the fluid flow rate 163 prior to placement of the vascular access device 180 within the target blood vessel 162A (i.e., with the vascular access device 180 absent from the target blood vessel 162A) to define a first fluid flow rate. Similarly, the flow rate determination logic 134 may determine the fluid flow rate 163 through the target blood vessel 162A with the vascular access device 180 present within the target blood vessel 162A (i.e., after the vascular access device 180 is placed within the target blood vessel 162A) to define a second fluid flow rate. Thereafter, the flow rate determination logic 134 may calculate a percentage of the first fluid flow rate defined by the second fluid flow rate, (i.e., a ratio of the second fluid flow rate divided by the first fluid flow rate) and the flow rate determination logic 134 depict the percentage of the first fluid flow rate on the display 150.

In some embodiments, the flow rate determination logic 134 may store data composed of multiple corresponding combinations of the target blood vessel cross-sectional area, the vascular access device cross-sectional area, the first fluid flow rate, and the second fluid flow rate as acquired during operation of the ultrasound imaging system to define a training set of historical blood flow data. The flow rate determination logic 134 may also perform operations (e.g., statistical operations) on the training set of historical blood flow data to predict a second fluid flow rate with the vascular access 180 device present within the target blood vessel 162A based on a determined first fluid flow rate with the vascular access device 160 absent from the target blood vessel 162A. In some embodiments, the flow rate determination logic 134 may depict the predicted second fluid flow rate on the display 150. As such, the clinician may be notified by the system 100 regarding the effect that placing the vascular access device 180 would have on the fluid flow rate 163 prior placing the vascular access device 180 within the blood vessel 162A. The flow rate determination logic 134 may also calculate other parameters related to the first and second fluid flow rates, such as a flow rate difference between the first and second fluid flow rates, or a percent difference between the first and second fluid flow rates, for example. Furthermore, the flow rate determination logic 134 may depict the calculated other parameters on the display 150.

In some embodiments, the flow rate determination logic 134 may determine the fluid flow rate 163 through the target blood vessel 162A with the vascular access device 180 present within the target blood vessel 162A at a location along the target blood vessel 162A upstream of the vascular device 180 to define an upstream fluid flow rate 163C. Similarly, the flow rate determination logic 134 may determine the fluid flow rate 163 through the target blood vessel 162A with the vascular access device 180 present within the target blood vessel 162A at a location along the target blood vessel 162A downstream of the vascular device 180 to define a downstream fluid flow rate 163D. In some embodiments, the flow rate determination logic 134 may calculate a difference between the upstream fluid flow rate 163C and the downstream fluid flow rate 163D including a percent difference between the upstream fluid flow rate 163C and the downstream fluid flow rate 163D. The flow rate determination logic 134 may also be configured to depict the upstream fluid flow rate 163C, downstream fluid flow rate 163D, the difference between the upstream fluid flow rate 163C and the downstream fluid flow rate 163D, and/or the percent difference between the upstream fluid flow rate 163C and the downstream fluid flow rate 163D, on the display 150.

In some embodiments, the flow rate determination logic 134 may store data composed of multiple corresponding combinations of the target blood vessel cross-sectional area, the vascular access device cross-sectional area, the upstream fluid flow rate 163C, and the downstream fluid flow rate 163D as acquired during operation of the ultrasound imaging system 100 to define a training set of historical upstream/downstream blood flow data. The flow rate determination logic 134 may also perform operations (e.g., statistical operations) on the training set of historical upstream/downstream blood flow data to predict a downstream fluid flow rate based on a determined upstream fluid flow rate. The flow rate determination logic 134 may also depict the predicted downstream fluid flow rate on the display 150. The flow rate determination logic 134 may also calculate other parameters related to the determined upstream fluid flow rate and predicted downstream fluid flow rate, such as a flow rate difference between the determined upstream fluid flow rate and predicted downstream fluid flow rate, or a percent difference between the determined upstream fluid flow rate and predicted downstream fluid flow rate, for example. As such, the clinician may be notified by the ultrasound imaging system 100 regarding the effect that placing the vascular access device 180 would have on the downstream fluid flow rate 163D prior placing the vascular access device 180 within the blood vessel 162A.

In some embodiments, the overlay logic 140 may be configured to generate a flow rate data icon and overlay the flow rate data received from the doppler array 114 or the flow rate data icon on the ultrasound image received from the ultrasound array 112. In some embodiments, the flow rate data icon may have various shapes, sizes, or colors, wherein each shape, size, or color may correspond to a specific flow rate (e.g., a heat map). In some embodiments, overlay logic 140 may be configured to overlay the flow rate data or the flow rate data icon adjacent the region of interest 162 in the ultrasound image 151.

In some embodiments, the transmission logic 142 may be configured to transmit the ultrasound image 151 and fluid rate information to the display 150. In some embodiments, the transmission logic 142 may be configured to transmit the overlay of the doppler ultrasound data to the display 150 for depiction over the ultrasound image 151.

In some embodiments, the data store 144 may be configured to store historical acquired ultrasound images 151 and any related fluid flow rate data acquired the doppler array 114. The data store 144 may store the processing result of the fluid flow rate data, such as statistical calculations, for example. In some embodiments, data store 144 may store all historical data received by the logic and all processing results of the logic.

FIG. 5 illustrates a flow chart of an exemplary method 200 of assessing a blood flow rate through a blood vessel that, according to some embodiments, may include all or any subset of the following steps, actions, or processes. The method 200 may include acquiring an ultrasound image of a target area of a patient (block 202) via the ultrasound array of the ultrasound probe. The method 200 may further include identifying a region of interest within the ultrasound image, where the region of interest includes the blood vessel. The method 200 may further include determining a blood flow rate through the blood vessel via a doppler array of the ultrasound probe prior to and after placement of a vascular access device within the blood vessel (block 204) where the blood flow rate prior to placement of the vascular access device defines a first blood flow rate and where the blood flow rate after placement of the vascular access device defines a second blood flow rate. The method 200 may further include calculating a difference between the first blood flow rate and the second blood flow rate.

In some embodiments, the method 200 may further include correlating the difference between the first blood flow rate and the second blood flow rate with a percentage of the cross-sectional area of the target blood vessel occupied by the cross-sectional area of the vascular access device (block 206). As such, the method 200 may include (i) acquiring the ultrasound image with the vascular access device disposed within the blood vessel, (ii) determining a cross-sectional area of the target blood vessel from the ultrasound image, (iii) determining a cross-sectional area of the vascular access device from the ultrasound image. The method 200 may further include determining a percentage of a cross-sectional area of the target blood vessel occupied by a cross-sectional area of the vascular access device.

In some embodiments, the method 200 may further include utilizing a training set of historical blood flow data to predict a second blood flow rate based on a determined first blood flow rate (block 208). As such, the method 200 may further include (i) storing data composed of multiple corresponding combinations of the target blood vessel cross-sectional area, the vascular access device cross-sectional area, the first blood flow rate, and the second blood flow rate to define the training set of historical blood flow data; and (ii) performing operations (e.g., statistical operations) on the training set of historical blood flow data to predict a second blood flow rate with the vascular access device present within the target blood vessel based on a determined first blood flow rate with the vascular access device absent from the target blood vessel. In some embodiments, the method 200 may include determining a confidence for the predicted second blood flow rate. In further embodiments, the method 200 may include storing additional data composed of combinations of the target blood vessel cross-sectional area, the vascular access device cross-sectional area, the first blood flow rate, and the second blood flow rate to increase the confidence for the predicted second blood flow rate.

In some embodiments, the method 200 may further correlating a difference between an upstream blood flow rate and a downstream blood flow rate with the percentage of the cross-sectional area of the target blood vessel occupied by the cross-sectional area of the vascular access device (block 210). As such, the method 200 may include determining a blood flow rate upstream of the vascular access device and determining a blood flow rate downstream of the vascular access. The method 200 may further include calculating a difference between the upstream blood flow rate and the downstream blood flow rate.

In some embodiments, the method 200 may further include utilizing a training set of historical upstream/downstream blood flow data to predict a downstream blood flow rate (block 212). As such, the method 200 may further include (i) storing data composed of multiple corresponding combinations of the target blood vessel cross-sectional area, the vascular access device cross-sectional area, the upstream blood flow rate, and the downstream blood flow rate to define a training set of historical upstream/downstream blood flow data; and (ii) performing operations on the training set of historical upstream/downstream blood flow data to predict the downstream blood flow rate based on a determined upstream blood flow rate. In some embodiments, the method 200 may include determining a confidence for the predicted downstream blood flow rate. In further embodiments, the method 200 may include storing additional data composed of combinations of the target blood vessel cross-sectional area, the vascular access device cross-sectional area, the upstream blood flow rate, and the downstream blood flow rate to increase the confidence for the predicted downstream blood flow rate.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. An ultrasound imaging system, comprising:
   an ultrasound probe, comprising:
   an ultrasound array configured to acquire an ultrasound image of a target area of a patient, and
   a doppler array configured to determine a blood flow rate through a region of interest within the ultrasound image, wherein:
   the region of interest includes a target blood vessel,
   the target blood vessel includes an insertion site configured for insertion of a vascular access device therethrough, and
   the blood flow rate through the region of interest includes a blood flow rate through the target blood vessel; and
   a console coupled with the ultrasound array and the doppler array, the console including one or more processors and a memory having logic stored thereon that, when executed by the one or more processors, performs operations, including:
   acquiring the ultrasound image of the target area;
   storing data composed of multiple ultrasound images acquired during operation of the ultrasound imaging system, wherein each ultrasound image is paired with a corresponding region of interest selected by a clinician to define a training set of region of interest data;

performing operations on the training set of region of interest data to define a suggested region of interest within the acquired ultrasound image;

identifying the region of interest within the ultrasound image based on the training set of region of interest data;

determining the blood flow rate via the doppler array through the target blood vessel at a location along the target blood vessel upstream of the insertion site; and determining the blood flow rate via the doppler array through the target blood vessel at the location along the target blood vessel downstream of the insertion site.

2. The system according to claim 1, wherein identifying the region of interest includes selecting the region of interest by the clinician.

3. The system according to claim 1, wherein the operations further include overlaying on the ultrasound image an indication of the suggested region of interest.

4. The system according to claim 1, wherein identifying the region of interest includes automatically identifying the region of interest based on the training set of region of interest data.

5. The system according to claim 1, wherein the operations further include determining a cross-sectional area of the target blood vessel from the ultrasound image.

6. The system according to claim 1, wherein the ultrasound image includes the vascular access device inserted through the insertion site and disposed within the target blood vessel.

7. The system according to claim 6, wherein the operations further include determining a cross-sectional area of the vascular access device from the ultrasound image.

8. The system according to claim 7, wherein the operations further include determining a percentage of a cross-sectional area of the target blood vessel occupied by the cross-sectional area of the vascular access device.

9. The system according to claim 1, wherein the operations further include determining the blood flow rate through the target blood vessel with the vascular access device absent from the target blood vessel to define a first blood flow rate.

10. The system according to claim 9, wherein the operations further include determining the blood flow rate through the target blood vessel with the vascular access device present within the target blood vessel to define a second blood flow rate.

11. The system according to claim 10, wherein the operations further include:

calculating a ratio of the second blood flow rate divided by the first blood flow rate, and depicting the ratio in terms of percentage of the first blood flow rate on a display.

12. The system according to claim 10, wherein the operations further include:

storing data composed of multiple corresponding combinations of the cross-sectional area of the target blood vessel, the cross-sectional area of the vascular access device, the first blood flow rate, and the second blood flow rate as acquired during operation of the ultrasound imaging system to define a training set of historical blood flow data; and performing operations on the training set of historical blood flow data to predict the second blood flow rate with the vascular access device present within the target blood vessel based on a determined first blood flow rate with the vascular access device absent from the target blood vessel.

13. The system according to claim 12, wherein the operations further include depicting the second blood flow rate on a display.

14. The system according to claim 6, wherein the operations further include determining the blood flow rate through the target blood vessel with the vascular access device present within the target blood vessel at the location along the target blood vessel upstream of the vascular access device to define an upstream blood flow rate.

15. The system according to claim 6, wherein the operations further include determining the blood flow rate through the target blood vessel with the vascular access device present within the target blood vessel at the location along the target blood vessel downstream of the vascular access device to define a downstream blood flow rate.

16. The system according to claim 15, wherein the operations further include:

storing data composed of multiple corresponding combinations of the cross-sectional area of the target blood vessel, the cross-sectional area of the vascular access device, an upstream blood flow rate, and the downstream blood flow rate as acquired during operation of the ultrasound imaging system to define a training set of historical upstream/downstream blood flow data; and performing operations on the training set of historical upstream/downstream blood flow data to predict downstream blood flow rate based on a determined upstream blood flow rate.

17. The system according to claim 16, wherein the operations further include depicting the predicted downstream blood flow rate on a display.

18. A method of assessing a blood flow rate through a blood vessel, comprising:

acquiring an ultrasound image of a target area of a patient via an ultrasound array of an ultrasound probe;

identifying a region of interest within the ultrasound image, the region of interest including the blood vessel;

determining the blood flow rate through the blood vessel via a doppler array of the ultrasound probe prior to placement of a vascular access device within the blood vessel to define a first blood flow rate;

determining the blood flow rate through the blood vessel via the doppler array after placement of the vascular access device within the blood vessel to define a second blood flow rate; and calculating a difference between the first blood flow rate and the second blood flow rate.

19. The method according to claim 18, further comprising:

acquiring the ultrasound image with the vascular access device disposed within the blood vessel;

determining a cross-sectional area of a target blood vessel from the ultrasound image;

determining a cross-sectional area of the vascular access device from the ultrasound image;

determining a percentage of the cross-sectional area of the target blood vessel occupied by the cross-sectional area of the vascular access device; and correlating the difference between the first blood flow rate and the second blood flow rate with the percentage of the cross-sectional area of the target blood vessel occupied by the cross-sectional area of the vascular access device.

20. The method according to claim 19, wherein operations further include:
- storing data composed of multiple corresponding combinations of the cross-sectional area of the target blood vessel, the cross-sectional area of the vascular access device, the first blood flow rate, and the second blood flow rate to define a training set of historical blood flow data; and
- performing operations on the training set of historical blood flow data to predict the second blood flow rate with the vascular access device present within the target blood vessel based on a determined first blood flow rate with the vascular access device absent from the target blood vessel.

21. The method according to claim 19, further comprising:
- determining the blood flow rate through the target blood vessel with the vascular access device present within the target blood vessel at the location along the target blood vessel upstream of the vascular access device to define an upstream blood flow rate;
- determining the blood flow rate through the target blood vessel with the vascular access device present within the target blood vessel at the location along the target blood vessel downstream of the vascular access device to define a downstream blood flow rate;
- calculating a difference between the upstream blood flow rate and the downstream blood flow rate; and
- correlating the difference between the upstream blood flow rate and the downstream blood flow rate with the percentage of the cross-sectional area of the target blood vessel occupied by the cross-sectional area of the vascular access device.

22. The method according to claim 21, wherein operations further include:
- storing data composed of multiple corresponding combinations of the cross-sectional area of the target blood vessel, the cross-sectional area of the vascular access device, the upstream blood flow rate, and the downstream blood flow rate to define a training set of historical upstream/downstream blood flow data; and
- performing operations on the training set of historical upstream/downstream blood flow data predict the downstream blood flow rate based on a determined upstream blood flow rate.

* * * * *